US009911989B2

(12) United States Patent
McElroy et al.

(10) Patent No.: US 9,911,989 B2
(45) Date of Patent: *Mar. 6, 2018

(54) FUEL CELL SYSTEM WITH PARTIAL RECYCLING OF ANODE EXHAUST

(75) Inventors: James McElroy, Suffield, CT (US); Swaminathan Venkataraman, Cupertino, CA (US); John Finn, Mountain View, CA (US); M. Douglas LeVan, Brentwood, TN (US); Fred Mitlitsky, Livermore, CA (US)

(73) Assignee: BLOOM ENERGY CORPORATION, Sunnyvale, CA (US)

( * ) Notice: Subject to any disclaimer, the term of this patent is extended or adjusted under 35 U.S.C. 154(b) by 1846 days.

This patent is subject to a terminal disclaimer.

(21) Appl. No.: 11/491,487

(22) Filed: Jul. 24, 2006

(65) Prior Publication Data

US 2010/0239924 A1    Sep. 23, 2010

Related U.S. Application Data

(60) Provisional application No. 60/701,976, filed on Jul. 25, 2005.

(51) Int. Cl.
*H01M 8/04089* (2016.01)
*H01M 8/04007* (2016.01)
(Continued)

(52) U.S. Cl.
CPC ... *H01M 8/04097* (2013.01); *H01M 8/04007* (2013.01); *H01M 8/04231* (2013.01);
(Continued)

(58) Field of Classification Search
CPC .................. H01M 8/04097; H01M 8/04007
(Continued)

(56) References Cited

U.S. PATENT DOCUMENTS 3,488,266 A    1/1970   French
4,041,210 A    8/1977   Van Dine
(Continued)

FOREIGN PATENT DOCUMENTS

JP    11-86888       3/1999
JP    2004-247290    9/2004
(Continued)

OTHER PUBLICATIONS

"Type BPL Granular Carbon", Calgon Product Bulletin, Calgon Corporation, Activated Carbon Division, 2 pgs.
(Continued)

*Primary Examiner* — Miriam Stagg
*Assistant Examiner* — Brent C Thomas
(74) *Attorney, Agent, or Firm* — The Marbury Law Group PLLC

(57) ABSTRACT

A method of operating a fuel cell system includes providing a fuel inlet stream into a fuel cell stack, operating the fuel cell stack to generate electricity and a hydrogen containing fuel exhaust stream having a temperature above 200 C, lowering a temperature of the fuel exhaust stream to 200 C or less, separating the fuel exhaust stream into a first separated fuel exhaust stream and a second separated fuel exhaust stream, and recycling the first separated fuel exhaust stream into the fuel inlet stream.

12 Claims, 7 Drawing Sheets

(51) Int. Cl.
*H01M 8/04223* (2016.01)
*H01M 8/0612* (2016.01)
*H01M 8/0668* (2016.01)
*H01M 8/124* (2016.01)

(52) U.S. Cl.
CPC ....... *H01M 8/0612* (2013.01); *H01M 8/0668* (2013.01); *H01M 2008/1293* (2013.01)

(58) Field of Classification Search
USPC ....................................................... 429/423
See application file for complete search history.

(56) References Cited

U.S. PATENT DOCUMENTS

| | | | |
|---|---|---|---|
| 4,182,795 A | 1/1980 | Baker et al. | |
| 4,532,192 A | 7/1985 | Baker et al. | |
| 4,792,502 A | 12/1988 | Trocciola et al. | |
| 4,898,792 A | 2/1990 | Singh et al. | |
| 4,917,971 A | 4/1990 | Farooque | |
| 4,983,471 A | 1/1991 | Reichner et al. | |
| 5,034,287 A | 7/1991 | Kunz | |
| 5,047,299 A | 9/1991 | Shockling | |
| 5,084,362 A | 1/1992 | Farooque | |
| 5,143,800 A | 9/1992 | George et al. | |
| 5,169,730 A | 12/1992 | Reichner et al. | |
| 5,170,124 A | 12/1992 | Blair et al. | |
| 5,302,470 A | 4/1994 | Okada et al. | |
| 5,441,821 A | 8/1995 | Merritt et al. | |
| 5,498,487 A | 3/1996 | Ruka et al. | |
| 5,501,914 A | 3/1996 | Satake et al. | |
| 5,505,824 A | 4/1996 | McElroy | |
| 5,527,631 A | 6/1996 | Singh et al. | |
| 5,573,867 A | 11/1996 | Zafred et al. | |
| 5,601,937 A | 2/1997 | Isenberg | |
| 5,686,196 A | 11/1997 | Singh et al. | |
| 5,733,675 A | 3/1998 | Dederer et al. | |
| 5,741,605 A | 4/1998 | Gillett et al. | |
| 5,955,039 A | 9/1999 | Dowdy | |
| 6,013,385 A | 1/2000 | DuBose | |
| 6,051,125 A | 4/2000 | Pham et al. | |
| 6,106,964 A | 8/2000 | Voss et al. | |
| 6,280,865 B1 | 8/2001 | Eisman et al. | |
| 6,329,090 B1 | 12/2001 | McElroy et al. | |
| 6,348,278 B1 | 2/2002 | LaPierre et al. | |
| 6,403,245 B1 | 6/2002 | Hunt | |
| 6,436,562 B1 | 8/2002 | DuBose | |
| 6,451,466 B1 | 9/2002 | Grasso et al. | |
| 6,531,243 B2 | 3/2003 | Thom | |
| 6,623,880 B1 | 9/2003 | Geisbrecht et al. | |
| 6,655,150 B1 | 12/2003 | Asen et al. | |
| 6,821,663 B2 | 4/2004 | McElroy et al. | |
| 6,924,053 B2 | 8/2005 | McElroy | |
| 2001/0049035 A1 | 12/2001 | Haltiner, Jr. et al. | |
| 2002/0015867 A1 | 2/2002 | Cargnelli et al. | |
| 2002/0028362 A1 | 3/2002 | Prediger et al. | |
| 2002/0058175 A1 | 5/2002 | Ruhl | |
| 2002/0106544 A1 | 8/2002 | Noetzel et al. | |
| 2003/0157386 A1 | 8/2003 | Gottmann | |
| 2003/0162067 A1 | 8/2003 | McElroy | |
| 2003/0196893 A1 | 10/2003 | McElroy | |
| 2003/0205641 A1 | 11/2003 | McElroy | |
| 2004/0081859 A1 | 4/2004 | McElroy et al. | |
| 2004/0157094 A1* | 8/2004 | Reiser et al. | 429/13 |
| 2004/0191597 A1 | 9/2004 | MdElroy | |
| 2004/0191598 A1* | 9/2004 | Gottmann et al. | 429/30 |
| 2004/0202914 A1 | 10/2004 | Sridhar et al. | |
| 2004/0224193 A1 | 11/2004 | Mitlitsky et al. | |
| 2005/0048334 A1 | 3/2005 | Sridhar et al. | |
| 2005/0053814 A1* | 3/2005 | Imamura et al. | 429/22 |
| 2005/0106429 A1* | 5/2005 | Keefer | 429/20 |
| 2005/0164051 A1 | 7/2005 | Venkataraman et al. | |
| 2005/0196659 A1* | 9/2005 | Grieve et al. | 429/34 |
| 2006/0083964 A1 | 4/2006 | Edlinger et al. | |
| 2006/0251934 A1 | 11/2006 | Valensa et al. | |
| 2006/0263657 A1* | 11/2006 | Kelly et al. | 429/19 |
| 2007/0017367 A1 | 1/2007 | McElroy et al. | |
| 2007/0017368 A1 | 1/2007 | LeVan et al. | |
| 2007/0017369 A1 | 1/2007 | LeVan et al. | |
| 2007/0178338 A1 | 8/2007 | McElroy et al. | |

FOREIGN PATENT DOCUMENTS

| | | |
|---|---|---|
| WO | WO 03/019707 A1 | 3/2003 |
| WO | WO 2004/013258 A1 | 2/2004 |
| WO | WO 2004/076017 A2 | 9/2004 |
| WO | WO 2004076017 A2 * | 9/2004 |
| WO | WO 2004/093214 | 10/2004 |
| WO | 2004095618 A1 | 11/2004 |
| WO | 2004095618 A2 | 11/2004 |
| WO | WO 2004/095618 A2 | 11/2004 |

OTHER PUBLICATIONS

Berlier, Karl et al., "Adsorption of $CO_2$ on Microporous Materials. 1. On Activated Carbon and Silica Gel", J. Chem. Eng. Data, 1997, vol. 42, pp. 533-537.

EG & G, Parsons, Inc., SAIC. Fuel Cell Handbook. $5^{th}$ Edition. USDOE. Oct. 2000. 9-1-9-4; 9-12-9-14.

LeVan, M. Douglas et al., "Adsorption and Ion Exchange", Perry's Chemical Engineers' Handbook ($7^{th}$ Edition), 1997, 66 pgs.

LeVan, M. Douglas et al., "Fixed-Bed Adsorption of Gases: Effect of Velocity Variations on Transition Types", AIChE Journal, vol. 34, No. 6, Jun. 1988, pp. 996-1005.

Manchado, M. Cabrejas et al., "Adsorption of $H_2$, $O_2$, CO, and $CO_2$ on a γ-Alumina: Volumetric and Calorimetric Studies", Langmuir, vol. 10, 1994, pp. 685-691.

Olivier, Marie-Georges et al., "Adsorption of Light Hyrdocarbons and Carbon Dioxide on Silica Gel", J. Chem. Eng. Data, 1997, vol. 42, pp. 230-233.

Qi, Nan et al., "Adsorption equilibrium modeling for water on activated carbons", Carbon, vol. 43, 2005, pp. 2258-2263.

Rudisill, Edgar N. et al., "Coadsorption of Hydrocarbons and Water on BPL Activated Carbon", Ind. Eng. Chem. Res., 1992, vol. 31, pp. 1122-1130.

Sward, Brian K. et al., "Simple Flow-Through Apparatus for Measurement of Mass Transfer Rates in Adsorbent Particles by Frequency Response", Fundementals of Adsorption, K. Kaneko et al., eds., vol. 7, 2002, pp. 29-36. Published by IK International of Japan.

Sward, Brian K. et al., "Frequency Response Method for Measuring Mass Transfer Rates in Adsorbents via Pressure Perturbation", Adsorption, vol. 9, 2003, pp. 37-54.

Walton, Krista S. et al., "A Novel Adsorption Cycle for $CO_2$ Recovery: Experimental and Theoretical Investigations of a Temperature Swing Compression Process", Revised Manuscript, submitted in 1995 to Separation Science & Technology, 30 pgs.

Yang, Ralph T., "Adsorbents: Fundamentals and Applications", 2003, 4 pgs.

Yong, Zou et al., "Adsorption of Carbon Dioxide on Basic Alumina at High Temperatures", J. Chem. Eng. Data, 2000, vol. 45, pp. 1093-1095.

Yong, Zou et al., "Adsorption of carbon dioxide at high temperature—a review", Separation and Purification Technology, vol. 26, 2002, pp. 195-205.

Supplementary European Search Report and European Search Opinion dated Oct. 16, 2009, in corresponding EP 06800263, 11 pages.

Notification of Reasons of Refusal issued in Japanese Patent Application No. 2008-524022, dated Jan. 24, 2012.

Office Action issued in Japanese Patent Application No. 2008-524022, dated Nov. 6, 2012.

* cited by examiner

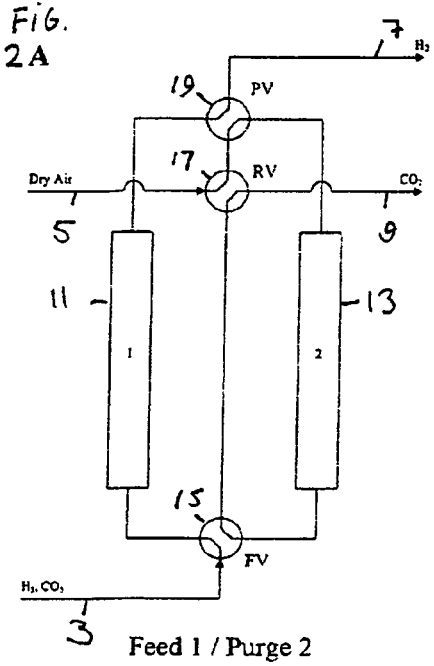
Fig. 2A Feed 1 / Purge 2
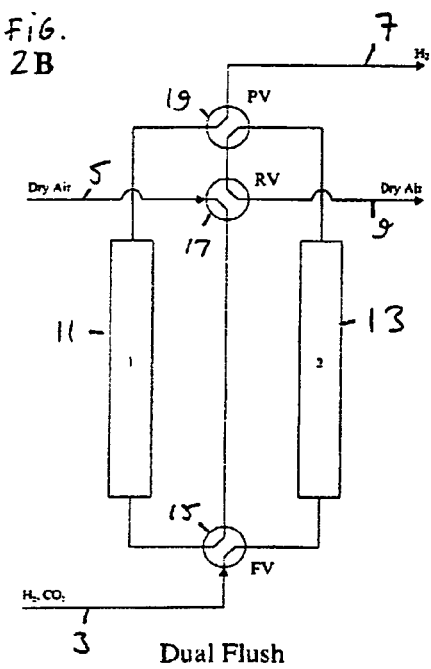
Fig. 2B Dual Flush
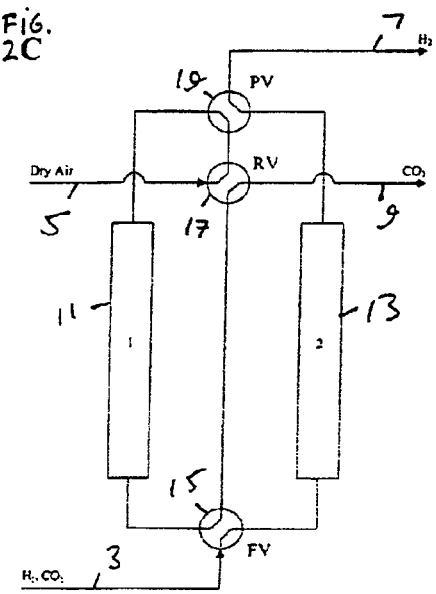
Fig. 2C Purge 1 / Feed 2
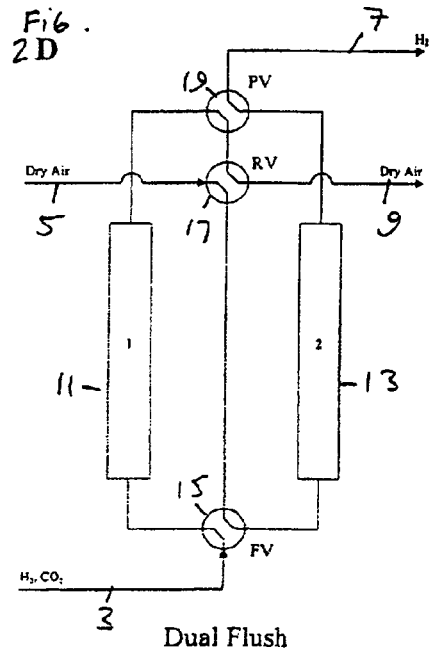
Fig. 2D Dual Flush

300

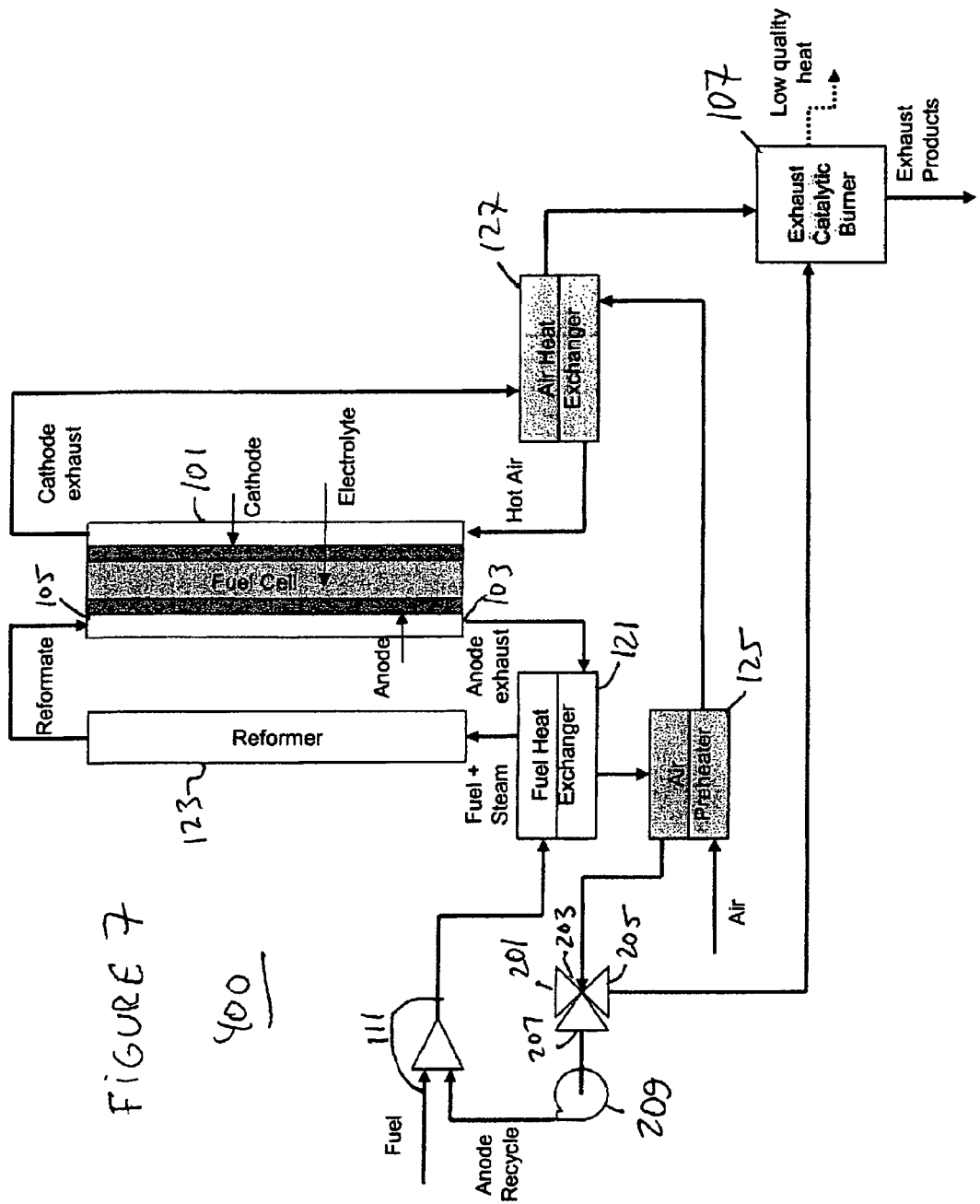

US 9,911,989 B2

FUEL CELL SYSTEM WITH PARTIAL RECYCLING OF ANODE EXHAUST

CROSS-REFERENCE TO RELATED PATENT APPLICATIONS

The present application claims benefit of U.S. provisional patent application Ser. No. 60/701,976, filed Jul. 25, 2005, which is incorporated herein by reference in entirety.

BACKGROUND OF THE INVENTION

The present invention relates generally to the field of fuel cell systems and more particularly to fuel cell systems with anode exhaust fuel recovery by partial pressure swing adsorption.

Fuel cells are electrochemical devices which can convert energy stored in fuels to electrical energy with high efficiencies. High temperature fuel cells include solid oxide and molten carbonate fuel cells. These fuel cells may operate using hydrogen and/or hydrocarbon fuels. There are classes of fuel cells, such as the solid oxide regenerative fuel cells, that also allow reversed operation, such that oxidized fuel can be reduced back to unoxidized fuel using electrical energy as an input.

BRIEF DESCRIPTION OF THE DRAWINGS

FIGS. 1, 2A, 2B, 2C, 2D, 3, and 4 are schematic diagrams of the partial pressure swing adsorption systems of the embodiments of the invention.

FIGS. 5, 6 and 7 are schematic diagrams of fuel cell systems of the embodiments of the invention.

SUMMARY OF THE INVENTION

Figure 1:
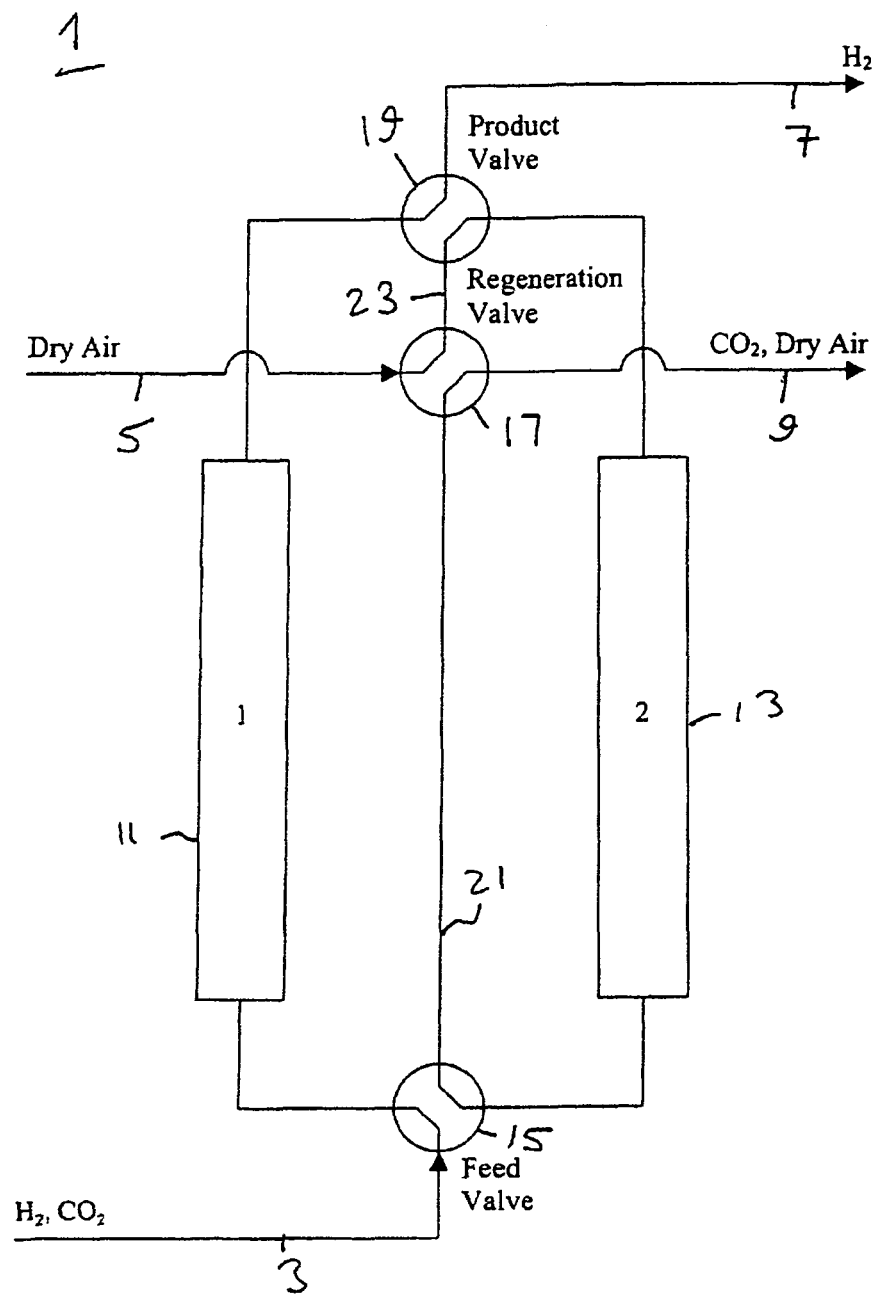

The embodiments of the invention provide a system and method in which a high temperature fuel cell stack fuel exhaust stream is separated into two streams. The first stream is recycled back into the fuel inlet stream of the high temperature fuel cell stack. The second stream may be sent to a hydrogen separation device which separates hydrogen from the fuel exhaust stream. The hydrogen separation device may be a partial pressure swing adsorption unit, a temperature swing adsorption unit or an electrochemical pump separation unit, such as a proton exchange membrane type separation unit. The separated hydrogen may also be recycled into the fuel inlet stream and/or provided to a hydrogen storage vessel or to a hydrogen using device, such as a low temperature fuel cell stack used to power a vehicle. Alternatively, the second stream may be vented or sent to a burner without additional hydrogen separation. In one aspect of the invention, a low temperature blower is used to controllably recycle a desired amount of the fuel exhaust stream into the fuel inlet stream. In this case, the fuel exhaust stream is cooled to a sufficiently low temperature, such as a temperature below 200 degrees Celsius before being provided into the low temperature blower. The first four embodiments below describe the partial pressure swing adsorption unit which may optionally be used to separate hydrogen from a fuel exhaust stream. The remaining embodiments describe the systems where the fuel exhaust stream is separated into two streams.

DETAILED DESCRIPTION OF THE PREFERRED EMBODIMENTS

The first embodiment of the invention provides a four-step partial pressure swing adsorption (i.e., concentration swing adsorption) cycle for gas separation, such as for recovering fuel from the fuel (i.e., anode side) exhaust of a solid oxide fuel cell stack. Two beds packed with an adsorbent material, such as activated carbon, are used to adsorb carbon dioxide and water (i.e., water vapor) from the fuel exhaust, allowing hydrogen and carbon monoxide to pass through the beds. The beds are regenerated, preferably countercurrently, with air dried to modest relative humidities, such as about 30% to about 50% relative humidity. For example, dry air for regeneration may be developed in a temperature swing adsorption cycle using silica gel or activated alumina. Flush steps are used to recover additional hydrogen and to prevent air from contaminating the recovered fuel. The duration of the adsorption and regeneration (i.e., feeding and purging) steps is preferably at least 5 times longer, such as 10-50 times longer than the duration of the flush steps.

Thus, a reliable, energy-efficient cycle for optimum gas separation is provided. For example, the cycle is a high efficiency cycle for maximum recovery of hydrogen and maximum rejection of carbon dioxide and air, based on a partial pressure swing adsorption (also referred to herein as concentration swing adsorption) with countercurrent purge and cocurrent flush steps. Since the beds are preferably regenerated with air, the sweeping of air left in the bed at the end of regeneration back into the fuel cell stack is not desirable. Furthermore, at the start of a regeneration step, the bed taken off stream contains hydrogen in the gas phase. Recovery of this hydrogen is desirable. The flush steps are used to remove the air left in the bed at the end of regeneration to prevent providing this air back into the fuel cell stack, and to provide the hydrogen remaining in the bed at the start of a regeneration step into the fuel inlet of the fuel cell stack.

While the system and method of the first embodiment will be described and illustrated with respect to an adsorption system which separates carbon dioxide from the hydrogen in a solid oxide fuel stack fuel exhaust stream, it should be noted that the system and method of the first embodiment may be used to separate any multicomponent gas stream that is not part of a fuel cell system or that is part of a fuel cell system other than a solid oxide fuel cell system, such as a molten carbonate fuel cell system for example. Thus, the system and method of the first embodiment should not be considered limited to separation of hydrogen from carbon dioxide. The adsorbent material in the adsorbent beds may be selected based on the gases being separated.

FIG. 1 illustrates a gas separation apparatus 1 of the first embodiment. The apparatus 1 contains a first feed gas inlet conduit 3, which in operation provides a feed gas inlet stream. If the apparatus 1 is used to separate hydrogen from a fuel cell stack fuel exhaust stream, then conduit 3 is operatively connected to the fuel cell stack anode exhaust. As used herein, when two elements are "operatively connected," this means that the elements are directly or indirectly connected to allow direct or indirect fluid flow from one element to the other. The apparatus 1 also contains a second purge gas inlet conduit 5, which in operation provides a purge gas inlet stream.

The apparatus contains a third feed gas collection conduit 7, which in operation collects at least one separated component of the feed gas. If the apparatus 1 is used to separate hydrogen from a fuel cell stack fuel exhaust stream and to recycle the hydrogen into the fuel inlet of the fuel cell stack, then conduit 7 is operatively connected to the fuel inlet of the fuel cell stack (i.e., either directly into the stack fuel inlet or to a fuel inlet conduit which is operatively connected to the stack fuel inlet). The apparatus also contains a fourth purge gas collection conduit 9, which in operation collects the feed gas outlet stream during the flush steps and collects the purge gas outlet stream during feed/purge steps.

Thus, if the apparatus 1 is used to separate hydrogen from a fuel cell stack fuel exhaust stream, then the first conduit 3 comprises a hydrogen, carbon dioxide, carbon monoxide and water vapor inlet conduit, the second conduit 5 comprises a dry air inlet conduit, the third conduit 7 comprises a hydrogen and carbon monoxide removal and recycling conduit and the fourth conduit 9 comprises a carbon dioxide and water vapor removal conduit.

The apparatus 1 also contains at least two adsorbent beds 11, 13. The beds may contain any suitable adsorbent material which adsorbs at least a majority, such as at least 80 to 95% of one or more desired components of the feed gas, and which allows a majority of one or more other components to pass through. For example, the bed material may comprise zeolite, activated carbon, silica gel or activated alumina adsorbent material. Activated carbon is preferred for separating hydrogen and carbon monoxide from water vapor and carbon dioxide in a fuel cell stack fuel exhaust stream. Zeolites adsorb carbon dioxide as well. However, they adsorb water very strongly, and a very dry gas should be used for regeneration, which is difficult to obtain. Thus, zeolite beds can preferably, but not necessarily, be used to separate a gas stream which does not contain water vapor because an apparatus which uses zeolite beds to separate a water vapor containing gas may experience a slow degradation of performance.

The apparatus 1 also comprises a plurality of valves which direct the gas flow. For example, the apparatus may contain three four-way valves with "double-LL" flow paths: a feed valve 15, a regeneration valve 17 and a product valve 19. The feed valve 15 is connected to the first conduit 3, to the two beds 11, 13 and to the regeneration valve 17 by conduit 21. The regeneration valve 17 is connected to the second and fourth conduits 5 and 9, respectively, to the feed valve 15 by conduit 21 and to the product valve 19 by conduit 23. The product valve 19 is connected to the third conduit 7, to the two beds 11, 13 and to the regeneration valve 17 by conduit 23. The four-way valves may be used to redirect two flows at a time. Such valves are available in a wide range of sizes, for example, from A-T Controls, Inc., Cincinnati, Ohio, USA, (http://www.a-tcontrols.com). If desired, each 4-way valve may be replaced by two 3-way valves or four 2-way valves, or by an entirely different flow distribution system involving a manifold.

Thus, the valves 15, 17, 19 are preferably operated such that the purge gas inlet stream is provided into the beds 11, 13 countercurrently with the feed gas inlet stream during the purge steps and cocurrently with the feed gas inlet stream during the flush steps. In other words, the first conduit 3 is operatively connected to the first and the second beds 11, 13 to provide the feed gas inlet stream into the first and the second beds in a first direction. The second conduit 5 is operatively connected to the first and the second beds 11, 13 through valves 17, 19 such that the purge gas inlet stream is provided into each of the first and the second beds 11, 13 in a different direction from the first direction (such as in the opposite direction) during the first and the second feed/purge steps, and the purge gas inlet stream is provided into the first and the second beds in the first direction (i.e., the same direction and the feed gas inlet stream) during the first and the second flush steps.

FIGS. 2A-2D illustrate the steps in the operation cycle of system 1. FIG. 2A shows the apparatus 1 during a first feed/purge step in which the first bed 11 is fed with a feed gas inlet stream, such as the fuel stack fuel exhaust stream, while the second bed 13 is fed with a purge gas, such as dried air, to regenerate the second bed 13.

The feed gas inlet stream is provided from conduit 3 through valve 15 into the first adsorbent bed 11. For a feed gas which contains hydrogen, carbon monoxide, carbon dioxide and water vapor, the majority of the hydrogen and carbon monoxide, such as at least 80-95% passes through the first bed 11, while a majority of the carbon dioxide, such as at least 80-95%, and much of the water vapor are adsorbed in the first bed. The feed gas outlet stream comprising at least one separated component of the feed gas, such as hydrogen and carbon monoxide, passes through valve 19 and is collected at a first output, such as the third conduit 7.

The purge gas inlet stream, such as dried air, is provided from the second conduit 5 through valve 17, conduit 23 and valve 19 into a second adsorbent bed 13. The purge gas outlet stream passes through conduit 21 and valves 15 and 17, and is collected at a second output, such as the fourth conduit 9.

In the first feed/purge step, the valve positions are such that valve 15 directs the feed to the first bed 11 and valve 19 directs the hydrogen product away to conduit 7. Valve 17 is positioned to sweep dry air counter currently through the second bed to remove carbon dioxide that was previously adsorbed. Some of the water in the feed gas steam is adsorbed on the adsorbent material, such as activated carbon, at the inlet of the first bed 11 and will be removed from the bed 11 when it is regenerated in a subsequent step. Carbon monoxide will be passed through the first bed 11 as the carbon dioxide wave advances.

FIG. 2B illustrates the apparatus 1 in a first flush step which is conducted after the first feed/purge step. In this step, the feed valve 15 and the regeneration valve 17 switch flow directions from the prior step, while the product valve 19 does not.

The purge gas inlet stream is provided from conduit 5 through valves 17 and 15 and conduit 21 into the first adsorbent bed 11. Preferably, this purge gas inlet stream is provided into the first bed 11 in the same direction as the feed gas stream in the previous step. The purge gas outlet stream, which comprises at least one component of the feed gas, such as hydrogen, that was trapped in a void volume of the first adsorbent bed, is collected at the first output, such as conduit 7.

The feed gas inlet stream is provided from conduit 3 through valve 15 into the second adsorbent bed 13. The feed gas outlet stream, which comprises a portion of the purge gas, such as air, that was trapped in a void volume of the second bed 13, passes through valves 19 and 17 and conduit 23 and is collected at an output different from the first output, such as at conduit 9.

Thus, in the first flush step, hydrogen trapped in the void volume of the first bed 11 is swept to product by the entering air and desorbing carbon dioxide. Air trapped in the void volume of the second bed 13 is purged from the bed 13 by the entering feed gas. This step improves the overall efficiency of the process by continuing to recover hydrogen that is trapped from the prior feed step and preventing air from the prior purge step from contaminating the hydrogen containing product after the next valve switch. This flush step is short, such as less than $\frac{1}{5}$ of the time of the prior feed/purge step, such as $\frac{1}{10}$ to $\frac{1}{50}$ of the time of the prior step. For example, for an about 90 second feed/purge step, the flush step may be about 4 seconds.

FIG. 2C shows the apparatus 1 during a second feed/purge step which is conducted after the first flush step. In this step, the second bed 13 is fed with a feed gas stream, such as the fuel stack fuel exhaust stream, while the first bed 11 is fed with a purge gas, such as dried air, to regenerate the first bed 11. Thus, in this step, the flow paths in valves 17 and 19 switch. This step is generally the same as the first feed/purge step, but with the beds reversed.

The feed gas inlet stream is provided from conduit 3 through valve 15 into the second adsorbent bed 13. Preferably the feed gas inlet stream is provided into the second bed 13 in the opposite (i.e., countercurrent) direction from the direction in which the purge gas inlet stream is provided into the second bed 13 in the first purge step. The feed gas outlet stream, which comprises at least one separated component of the feed gas, such as hydrogen and carbon monoxide, is collected at the first output, such as in the third conduit 7. The purge gas inlet stream is provided from conduit 5 through valves 17 and 19 and conduit 23 into the first adsorbent bed 11. Preferably the purge gas inlet stream is provided into the first bed 11 in the opposite (i.e., countercurrent) direction from the direction in which the feed gas inlet stream is provided into the first bed 11 in the first feed step. The purge gas outlet stream is collected from the first bed 11 at an output different from the first output, such as at the fourth conduit 9.

FIG. 2D illustrates the apparatus 1 in a second flush step which is conducted after the second feed/purge step. In this step, the feed valve 15 and the regeneration valve 17 switch flow directions from the prior step, while the product valve 19 does not. This step is similar to the first flush steps, but with the beds reversed.

The purge gas inlet stream is provided from conduit 5 through valves 17 and 15 and conduit 21 into the second adsorbent bed 13. Preferably, this steam is provided into the bed 13 in the same direction as the feed gas inlet stream in the prior two steps. The purge gas outlet stream, which comprises at least one component of the feed gas, such as hydrogen, that was trapped in a void volume of the second adsorbent bed 13, is collected at the first output, such as the third conduit 7.

The feed gas inlet stream is provided from conduit 3 through valve 15 into the first adsorbent bed 11. The feed gas outlet stream, which comprises a portion of the purge gas, such as air, that was trapped in a void volume of the first bed 11, is collected at an output different from the first output, such as at the fourth conduit 9. Then the first feed/purge step shown in FIG. 2A is repeated. In general, the four steps described above are repeated a plurality of times in the same order.

It should be noted the feed gas inlet stream is preferably provided in each of the first 11 and the second 13 adsorbent beds in the same direction in the steps described above. In the first and the second flush steps, the purge gas inlet stream is provided into each of the first and the second adsorbent beds in the same direction as the feed gas inlet stream direction. In contrast, in the first and the second feed/purge steps, the purge gas inlet stream is provided into each of the first and the second adsorbent beds in a different direction, such as the opposite direction, from the feed gas inlet stream direction.

The countercurrent purge gas inlet stream flow is advantageous because it is believed that it will reduce the amount of carbon dioxide in the hydrogen product stream compared to a co-current flow during the purge steps. Some water will adsorb near the inlet of the carbon bed during the feed step. During the purge or regeneration step, the bed is purged counter currently with dried air. Because activated carbon is used for adsorption of carbon dioxide and activated carbon does not adsorb water appreciably at moderately low relative humidities, in order to prevent accumulation of water in the bed, the regeneration purge only needs to be dried to a relative humidity of roughly 30 to 50%. During the feed step, carbon monoxide will be pushed into the product (with the hydrogen) by using the beds efficiently for carbon dioxide removal (i.e., by advancing the carbon dioxide wave reasonably far into the beds). The countercurrent regeneration step will reduce the level of carbon dioxide in the hydrogen stream in comparison to a cocurrent regeneration step. The dual flush step will maximize both hydrogen recovery and air rejection from the hydrogen product.

As noted above, in the partial pressure swing adsorption method, the feed gas inlet stream is not pressurized prior to being provided into the first and the second adsorbent beds. Furthermore, the above four steps are preferably conducted without external heating of the adsorbent beds.

In operation, the first bed 11 performs the following functions. It receives the feed gas inlet stream from the first conduit 3 and provides at least one separated component of the feed gas to the third conduit 7 in a first feed/purge step. It receives the purge gas inlet stream from the second conduit 5 and provides a purge gas outlet stream, which comprises at least one component of the feed gas that was trapped in a void volume of the first bed to the third conduit 7 in a first flush step. It receives a purge gas inlet stream from the second conduit 5 and provides a purge gas outlet stream to an output different from the third conduit 7, such as the fourth conduit 9, in a second feed/purge step. It also receives the feed gas inlet stream from the first conduit 3 and provides a feed gas outlet stream, which comprises a portion of the purge gas that was trapped in a void volume of the first bed, to at an output different from the third conduit 7, such as the fourth conduit 9, in a second flush step.

In operation, the second bed 13 performs the following functions. It receives a purge gas inlet stream from the second conduit 5 and provides a purge gas outlet stream to at an output different from the third conduit 7, such as the fourth conduit 9, in a first feed/purge step. It receives the feed gas inlet stream from the first conduit 3 and provides the feed gas outlet stream, which comprises a portion of the purge gas that was trapped in a void volume of the second bed 13, to an output different from the third conduit 7, such as the fourth conduit 9, in a first flush step. It receives the feed gas inlet stream from the first conduit 3 and provides the feed gas outlet stream comprising at least one separated component of the feed gas to the third conduit 7 in a second feed/purge step. It also receives the purge gas inlet stream from the second conduit 5 and provides the purge gas outlet stream, which comprises at least one component of the feed gas that was trapped in a void volume of the second bed 13 to the third conduit 7 in a second flush step.

Thus, at least a majority of the carbon dioxide and water vapor in the feed gas inlet stream is adsorbed by the first 11 and the second 13 adsorbent beds during the first and the second feed/purge steps, respectively. The adsorbed carbon dioxide and water vapor is removed from the first and the second adsorbent beds by the purge gas inlet stream during the second and the first feed/purge steps, respectively. The removed carbon dioxide and water vapor are collected with the purge gas outlet stream at the second output during the second and the first feed/purge steps.

It is noted that the regeneration (i.e., purging) of the bed will be accompanied by a cooling of the bed as $CO_2$ desorbs. It is believed that this will shift adsorption equilibrium to lower partial pressures for $CO_2$ and will slow regeneration. This and the expanding velocity front during regeneration may be taken into account in setting the purge gas (i.e., dry air) flow rate. For example, the inlet air volumetric flowrate for regeneration may be greater than, such as 1.5 times greater than, the outlet flowrate of hydrogen and carbon monoxide. It is believed that allowing for desorption of carbon dioxide during regeneration, the outlet flowrate for regeneration will exceed the inlet flowrate of the feed.

The apparatus 1 may have the following non-limiting features. The adsorbent bed material preferably comprises activated carbon for hydrogen separation from the fuel cell stack fuel exhaust. For example, Calgon BPL activated carbon, 6×16 or 4×10 mesh may be used. The beds 11, 13 may be cylindrical beds 2-12 inches in diameter and 1-6 feet long, such as 6 inches in diameter and 3 feet long, for example, depending on the size of the fuel cell stack and on the flow rate of the gases. The duration of the feed/purge steps may be more than 1 minute while the duration of the flush steps may be a few seconds. For example, the feed/purge duration may be 1 to 3 minutes, such as 1.5 minutes, while the flush duration may be 3-5 seconds, such as 4 seconds.

The method of the first embodiment is designed to provide a high hydrogen recovery (with flush steps), high carbon dioxide separation (with flush and countercurrent regeneration steps), high degree of air rejection (with flush steps), regeneration using a purge gas having a relatively low dryness, such as air having 30-50% relative humidity, low energy requirements, high robustness (i.e., easily tunable and adaptable to changes in operating conditions), simple operation with few moving parts, high scalability, and low to moderate capital cost.

The dry air for the purge steps may be obtained by any suitable method. For example, the dry air can easily be achieved using temperature swing adsorption cycle with water vapor absorbing beds, such as silica gel or activated alumina beds. Silica gel has a somewhat higher capacity for water than alumina. However, it will fracture if very dry and contacted with a water mist. If this is likely, a protective layer of a non-decrepitating silica gel can be used, or activated alumina can be used.

The temperature swing adsorption cycle uses two beds (i.e., beds other than beds 11, 13 shown in FIG. 1). One bed is used in the adsorption mode while the other is being regenerated (heated and cooled). The steps in the cycle are as follows.

In a first adsorption step, a working capacity of 10 mol $H_2O$/kg of silica gel can be used. Considering the worst case, the air would be saturated with water at 30° C. The partial pressure of water in air saturated at 30° C. is 0.042 bar. For example, to produce a dry air flow rate of 144 slpm from this wet air, 0.28 mol/min of water must be removed. At the designated working capacity, silica gel is consumed at a rate of 0.028 kg/min. A bed containing 2 kg of silica gel can remain on stream for 72 minutes. Given a specific gravity of silica gel of 0.72 (corresponding to a bulk density of 45 lb/ft$^3$), the bed will dry 4300 bed volumes of feed during this time (with 12,000 temperature corrected liters of wet feed dried by a bed 2.8 liters in volume). The dried air is provided through conduit 5 into the apparatus 1.

In a second heating step, the bed is heated counter currently with a warm feed (e.g., 80° C. or other suitable moderately warm or hot temperature). The bed is heated after about 1000 bed volumes have been passed into it. Somewhat more energy will be required to heat metal parts also.

In a third cooling step, the bed is cooled cocurrently (same direction as adsorption) with the wet air feed. It will take about 800 bed volumes to cool the bed. This will deposit water at the bed inlet and use up some of the capacity for adsorption, reducing it to about 3500 bed volumes. While the first bed is undergoing the adsorption step, the second bed is undergoing heating or cooling steps. While the second bed is undergoing the adsorption step, the first bed is undergoing heating or cooling steps.

It should be understood that the calculation above is highly conservative and approximate. It is based on air for regeneration that is available saturated with water at 30° C. Typically, the air will be drier. The regeneration requirements for the carbon beds are mild (e.g., 30-50% RH). Indeed, on a cool day or a dry day, drying the regeneration air would not be necessary. Also, if the driers went out of service for a short time, the process would not be endangered.

Figure 3:
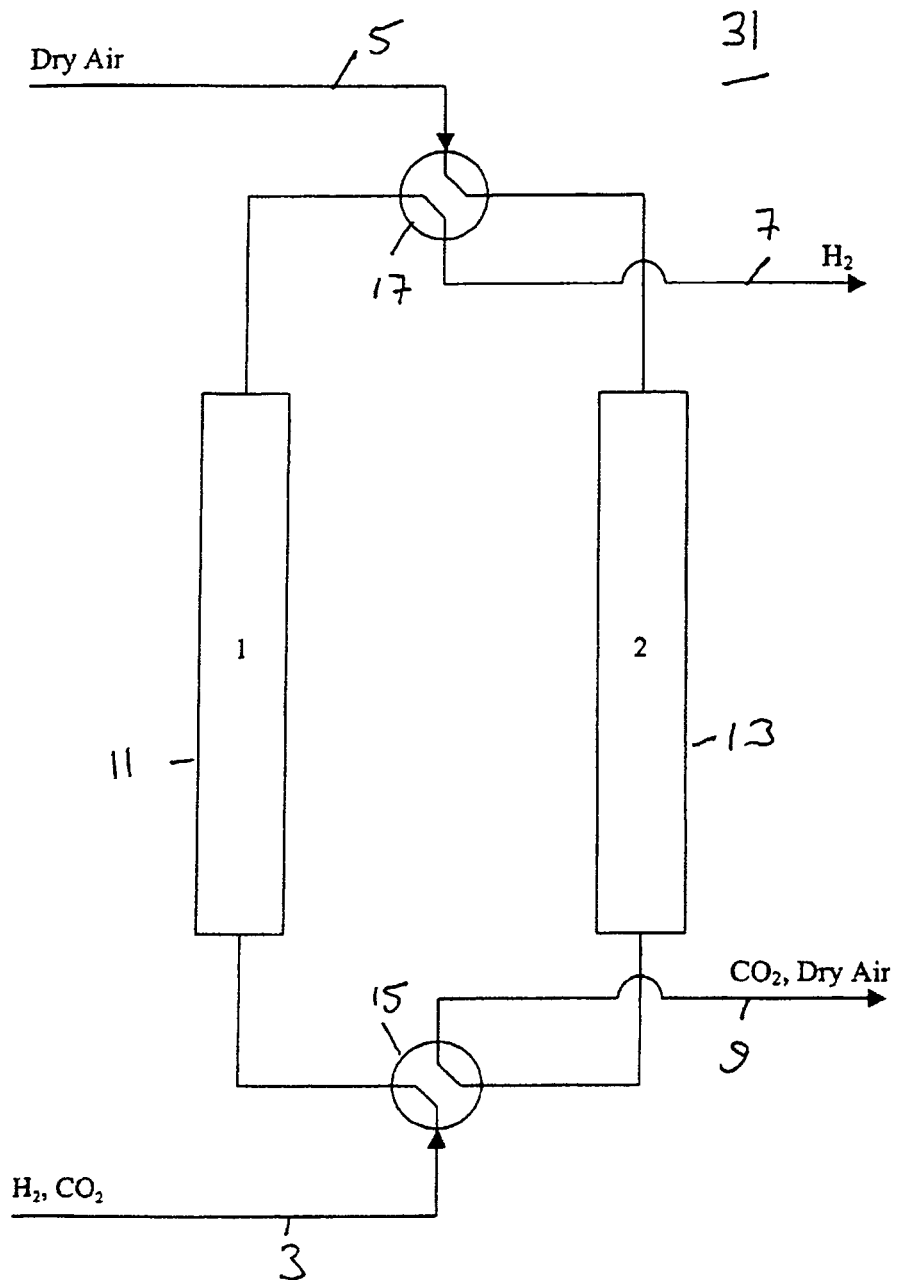

In a second embodiment of the invention, the apparatus 31 operates with a countercurrent purge but with no flush steps. FIG. 3 shows apparatus 31 using a simple cycle with a countercurrent purge but no flush. Two instead of three four-way valves 15, 17 are used. The apparatus 31 and method of using this apparatus are otherwise similar to the apparatus 1 and method of the first embodiment, except that the first and second flush steps are omitted.

The advantage of countercurrent purge is that carbon dioxide is removed from the bed outlet for the feed step, and higher hydrogen purities will result. But without the flush, about 5% of the hydrogen is not recovered, and air will somewhat contaminate the hydrogen containing product in conduit 7.

Figure 4:
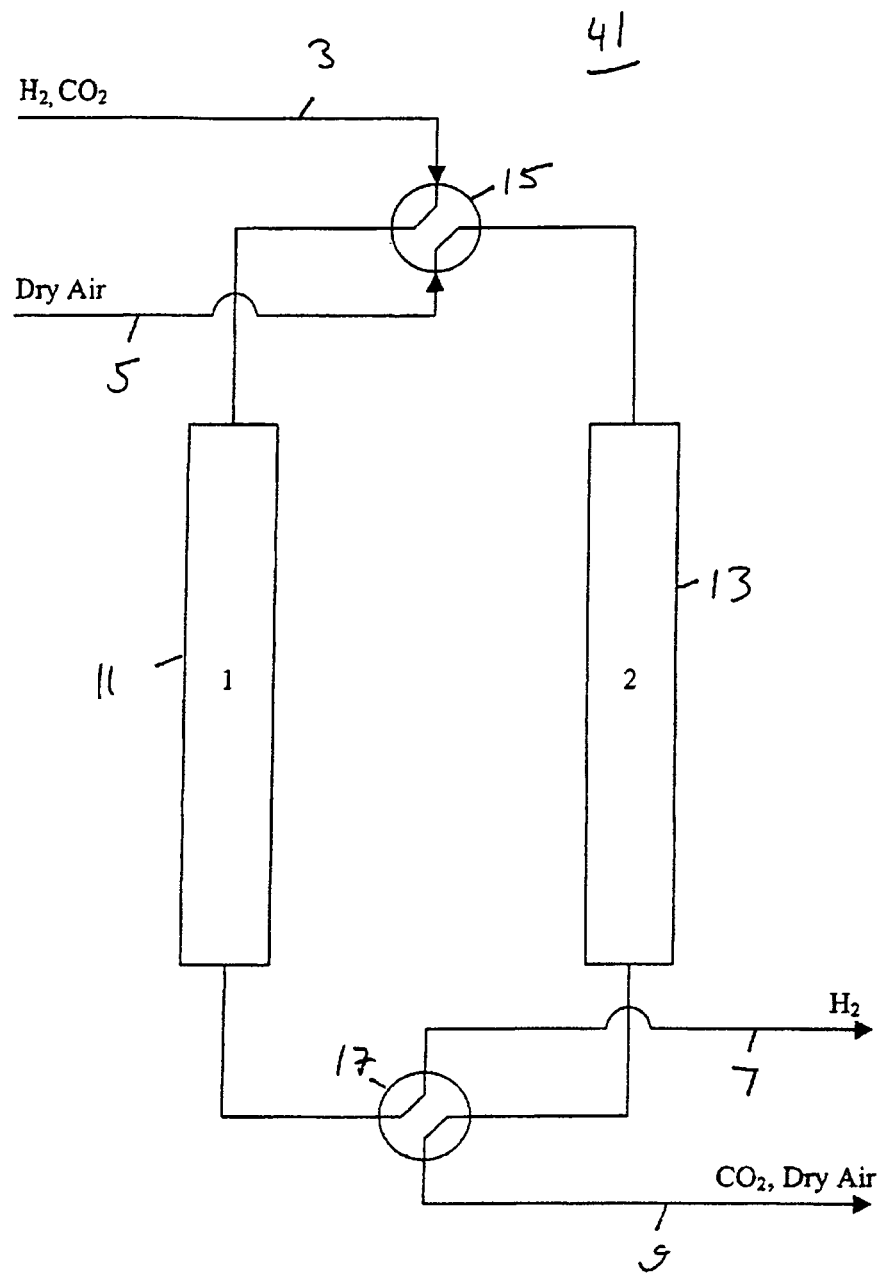

In a third embodiment of the invention, the apparatus 41 operates with a cocurrent purge with the flush steps. FIG. 4 shows the apparatus 41 using a cocurrent purge and flush. It also uses two instead of three four-way valves. The apparatus 41 and method of the third embodiment in many respects resembles the apparatus 1 and method of the first embodiment, except that the purge gas inlet stream is provided into the beds in the purge steps in the same direction as the feed gas inlet stream in the prior feed steps. The negative aspect of this cocurrent cycle is that any $CO_2$ left in the bed will be most concentrated near the outlet end for the adsorption step and will somewhat contaminate the hydrogen containing product provided to conduit 7.

In a fourth embodiment of the invention, the air purge gas is not pre-dried. In this embodiment, the apparatus may contain two or three carbon dioxide adsorbing beds. Some three-bed cycles that do not need dried air. For example, a bed of carbon used for carbon dioxide adsorption will slowly accumulate water from both the fuel cell stack fuel exhaust and the wet regeneration air. The bed could be used for many cycles, with decreasing capacity before it is completely regenerated. If regenerated counter currently, it would last longer than if regenerated cocurrently because water deposited during feed steps would be partially removed by the regenerating air and vice versa. Nevertheless, the bed would accumulate water over time.

In this embodiment, three beds would be used, with two actively running adsorption and regeneration cycles, as in the first embodiment, while a third bed is being more thoroughly regenerated by a thermal swing regeneration or by purging with a dried gas.

Furthermore, if atmospheric air were reasonably dry (i.e., RH<50% at 30° C.), then the partial pressure adsorption cycle may be used with two beds in exactly the same configuration as in the first embodiment. The purge gas would not deposit a significant amount of water on the carbon, and the countercurrent sweep of the air during regeneration would remove water adsorbed from the fuel cell stack fuel exhaust feed. Thus, if dry air was available from the atmosphere, then a separate air drying step is not needed.

The fifth, sixth and seventh embodiments of the invention illustrate a fuel cell system, such as a solid oxide fuel cell system, where the fuel exhaust stream is separated into two streams and one of the streams is recycled into the fuel inlet stream. It should be noted that fuel cell systems other than solid oxide fuel cell systems may also be used.

In the system of the fifth embodiment, a portion of the fuel cell stack fuel exhaust stream is directly recycled into the fuel inlet stream. Another portion of the fuel cell stack fuel exhaust stream is provided into the partial pressure adsorption apparatus of any of the first four embodiments, and the separated hydrogen is then recycled into the fuel inlet stream and/or is provided to a hydrogen storage vessel or to a hydrogen using device.

Figure 5:
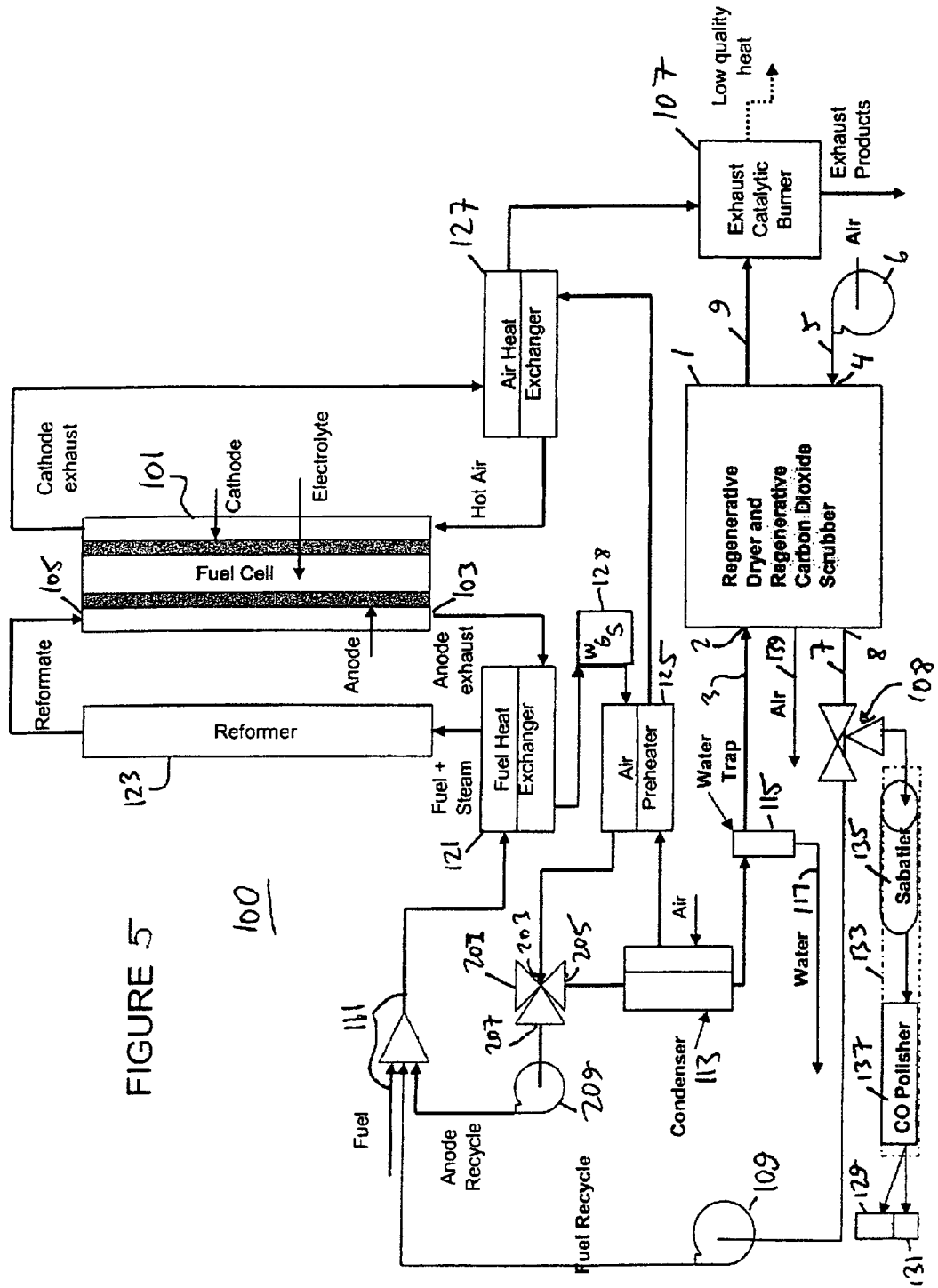

FIG. 5 illustrates a fuel cell system 100 of the fifth embodiment. The system 100 contains a fuel cell stack 101, such as a solid oxide fuel cell stack (illustrated schematically to show one solid oxide fuel cell of the stack containing a ceramic electrolyte, such as yttria or scandia stabilized zirconia, an anode electrode, such as a nickel-stabilized zirconia cermet, and a cathode electrode, such as lanthanum strontium manganite).

The system also contains a partial pressure swing adsorption ("PPSA") unit 1 of any of the first four embodiments comprising a plurality of adsorbent beds (not shown for clarity). The PPSA unit 1 acts as a regenerative dryer and carbon dioxide scrubber.

The system 100 also contains the first conduit 3 which operatively connects a fuel exhaust outlet 103 of the fuel cell stack 101 to a first inlet 2 of the partial pressure swing adsorption unit 1. For example, the first inlet 2 may comprise the feed valve 15 and/or an inlet to one of the beds 11, 13, shown in FIG. 1. The system 100 also contains the second conduit 5 which operatively connects a purge gas source, such as a dried or atmospheric air source 6 to a second inlet 4 of the partial pressure swing adsorption unit 1. The purge gas source 6 may comprise an air blower or compressor and optionally a plurality of temperature swing cycle adsorption beds.

The system also contains a third conduit 7 which operatively connects an outlet 8 of the partial pressure swing adsorption unit 1 to the hydrogen storage vessel or to the hydrogen using device. If desired, the third conduit 7 also operatively connects an outlet 8 of the partial pressure swing adsorption unit 1 to a fuel inlet 105 of the fuel cell stack 101, as will be described in more detail below. Preferably, the system 100 lacks a compressor which in operation compresses the fuel cell stack fuel exhaust stream to be provided into the partial pressure swing adsorption unit 1.

The system 100 also contains the fourth conduit 9 which removes the exhaust from the unit 1. The conduit 9 may be connected to a catalytic burner 107 or to an atmospheric vent. Optionally, the burner 107 may also be operatively connected to the stack fuel exhaust outlet 103 to provide a portion of the fuel exhaust stream into the burner 107 to sustain the reaction in the burner.

The system 100 also contains an optional selector valve 108, such as a multi-way valve, for example a three-way valve. The selector valve 108 has an inlet operatively connected to an outlet of the partial pressure swing adsorption unit 1, a first outlet operatively connected to the hydrogen storage vessel or to the hydrogen using device, and a second outlet operatively connected to a fuel inlet 105 of the fuel cell stack 101. In operation, the valve 108 divides the hydrogen containing stream provided from the PPSA unit 1 into a first stream, which is provided into the hydrocarbon fuel inlet stream, and a second stream which is provided to the hydrogen storage vessel or to the hydrogen using device. However, the valve 108 may be omitted and the system 100 may be configured to provide the entire hydrogen containing stream into the hydrocarbon fuel inlet stream, or to the hydrogen storage vessel or to the hydrogen using device, if such optional vessel or device are connected to the system 100.

Preferably, the second outlet of the selector valve 108 is operatively connected to the fuel inlet conduit 111 of the fuel cell stack 101 via a blower or a heat driven compressor 109. The device 109 has an inlet which is operatively connected to the partial pressure swing adsorption unit 1 (via the selector valve 108) and an outlet which is operatively connected to a fuel inlet 105 of the fuel cell stack 101. For example, conduit 7 connects the blower or compressor 109 to the unit 1 via the selector valve 108. In operation, the blower or compressor 109 controllably provides a desired amount of hydrogen and carbon monoxide separated from a fuel cell stack fuel exhaust stream into the fuel cell stack fuel inlet stream. Preferably, the device 109 provides the hydrogen and carbon monoxide into a fuel inlet conduit 111 which is operatively connected to the a fuel inlet 105 of the fuel cell stack 101. Alternatively, the device 109 provides the hydrogen and carbon monoxide directly into the fuel inlet 105 of the fuel cell stack 101.

The system 100 also contains a condenser 113 and water separator 115 having an inlet which is operatively connected to a fuel cell stack fuel exhaust 103 and an outlet which is operatively connected to an inlet 2 of the partial pressure swing adsorption unit 1. The condenser 113 and water separator 115 may comprise a single device which condenses and separates water from the fuel exhaust stream or they may comprise separate devices. For example, the condenser 113 may comprise a heat exchanger where the fuel exhaust stream is cooled by a cool counter or co-flow air stream to condense the water. The air stream may comprise the air inlet stream into the fuel cell stack 101 or it may comprise a separate cooling air stream. The separator 115 may comprise a water tank which collects the separated water. It may have a water drain 117 used to remove and/or reuse the collected water.

The system 100 also contains a recuperative heat exchanger 121 which exchanges heat between the stack fuel exhaust stream and the hydrocarbon fuel inlet stream being provided from the inlet conduit 111. The heat exchanger helps to raise the temperature of the fuel inlet stream and reduces the temperature of the fuel exhaust stream so that it may be further cooled in the condenser and such that it does not damage the humidifier.

If the fuel cells are external fuel reformation type cells, then the system 100 contains a fuel reformer 123. The reformer 123 reforms a hydrocarbon fuel inlet stream into hydrogen and carbon monoxide containing fuel stream which is then provided into the stack 101. The reformer 123 may be heated radiatively, convectively and/or conductively by the heat generated in the fuel cell stack 101 (i.e., the reformer is thermally integrated with the stack) and/or by the heat generated in an optional burner/combustor, as described in U.S. patent application Ser. No. 11/002,681, filed Dec. 2, 2004, incorporated herein by reference in its entirety. Alternatively, the external reformer 123 may be omitted if the stack 101 contains cells of the internal reforming type where reformation occurs primarily within the fuel cells of the stack.

Optionally, the system 100 also contains an air preheater heat exchanger 125. This heat exchanger 125 heats the air inlet stream being provided to the fuel cell stack 101 using the heat of the fuel cell stack fuel exhaust. If desired, this heat exchanger 125 may be omitted.

The system 100 also preferably contains an air heat exchanger 127. This heat exchanger 127 further heats the air inlet stream being provided to the fuel cell stack 101 using the heat of the fuel cell stack air (i.e., oxidizer or cathode) exhaust. If the preheater heat exchanger 125 is omitted, then the air inlet stream is provided directly into the heat exchanger 127 by a blower or other air intake device.

The system may also contain an optional water-gas shift reactor 128. The water-gas shift reactor 128 may be any suitable device which converts at least a portion of the water and carbon monoxide in the fuel exhaust stream into free hydrogen and carbon dioxide. For example, the reactor 128 may comprise a tube or conduit containing a catalyst which converts some or all of the carbon monoxide and water vapor in the fuel exhaust stream into carbon dioxide and hydrogen. Thus, the reactor 128 increases the amount of hydrogen in the fuel exhaust stream. The catalyst may be any suitable catalyst, such as a iron oxide or a chromium promoted iron oxide catalyst. The reactor 128 may be located between the fuel heat exchanger 121 and the air preheater heat exchanger 125.

Optionally, the system 100 is operatively connected to a hydrogen storage vessel 129 or a hydrogen using device 131. However, the vessel 129 or device 131 may be omitted and the system 100 may be used to only produce electricity rather than electricity and hydrogen together. The hydrogen storage vessel may comprise a hydrogen storage tank or a hydrogen dispenser. The vessel may contain a conduit leading to a hydrogen using device which is used in transportation, power generation, cooling, hydrogenation reactions, or semiconductor manufacture. For example, the system 100 may be located in a chemical or a semiconductor plant to provide primary or secondary (i.e., backup) power for the plant as well as hydrogen for use in hydrogenation (i.e., passivation of semiconductor device) or other chemical reactions which require hydrogen that are carried out in the plant.

The hydrogen using device 131 may also comprise another fuel cell system (such as a fuel cell stack), such as low temperature fuel cell system, such as a proton exchange membrane (PEM) fuel cell system, which uses hydrogen as a fuel. Thus, the hydrogen from the system 100 is provided as fuel to one or more additional fuel cells 131. For example, the system 100 may be located in a stationary location, such as a building or an area outside or below a building and is used to provide power to the building. The additional fuel cells 131 may be located in vehicles located in a garage or a parking area adjacent to the stationary location. A vehicle may comprise a car, sport utility vehicle, truck, motorcycle, boat or any other suitable fuel cell powered vehicle. In this case, the hydrocarbon fuel is provided to the system 100 to generate electricity for the building and to generate hydrogen which is provided as fuel to the fuel cell system 131 powered vehicles. The generated hydrogen may be stored temporarily in the hydrogen storage vessel 129 and then provided from the storage vessel to the vehicle fuel cells 131 on demand (analogous to a gas station) or the generated hydrogen may be provided directly from the system 100 to the vehicle fuel cells 131 through a conduit.

The system 100 may contain an optional hydrogen conditioner. The hydrogen conditioner may be any suitable device which can purify, dry, compress (i.e., a compressor), or otherwise change the state point of the hydrogen-rich gas stream provided from the PPSA unit 1. If desired, the hydrogen conditioner may be omitted.

The optionally hydrogen using device 131 may comprise a PEM fuel cell system or another similar device which is generally carbon monoxide intolerant. Thus, carbon monoxide has to be scrubbed (i.e., removed by gas separation and/or chemical reaction) from the hydrogen rich stream being provided from the PPSA unit 1 before the hydrogen rich stream is provided into the PEM fuel cells located in a vehicle or into another CO intolerant device 131.

In this case, the system 100 contains an optional carbon monoxide scrubbing device 133. The device 133 contains an inlet operatively connected to an outlet of the partial pressure swing adsorption unit 1 and an outlet operatively connected to a PEM fuel cell system 131 located in a vehicle. In operation, the carbon monoxide scrubbing device 133 scrubs carbon monoxide being provided with the hydrogen from the partial pressure swing adsorption unit 1 and provides the hydrogen either directly or indirectly to the PEM fuel cell system 131.

The carbon monoxide scrubbing device 133 may comprise any device which removes carbon monoxide from the hydrogen rich stream by adsorption, chemical reaction and/or any other suitable method. The device 133 may comprise a pressure swing adsorption unit and/or a Sabatier reactor. For example, as shown in FIG. 5, the scrubbing device comprises a Sabatier reactor 135 and a carbon monoxide polisher 137. The Sabatier reactor comprises a tube or another container which contains a catalyst, such as a platinum family metal on an alumina support. Preferably, the catalyst comprises ruthenium. A gas mixture consisting primarily of hydrogen and carbon monoxide is introduced into reactor tube from the PPSA system 1 and contacts the catalyst therein. The gas mixture undergoes an immediate exothermic reaction and converts the carbon monoxide and some of the hydrogen to methane and water vapor. Remaining carbon monoxide is then additionally scrubbed from the hydrogen, methane and water vapor gas stream in the polisher 137, which may comprise a silver based adsorption device which adsorbs carbon monoxide. The polisher may comprise plural adsorption beds where one bed adsorbs carbon monoxide while other beds are being regenerated. The outlet stream containing hydrogen, methane and water vapor from the polisher is then provided to the hydrogen storage vessel 129 or the hydrogen using device 131 (the separate purge gas outlet from the polisher 137 is not shown for clarity). The hydrogen may be used as the fuel in the PEM fuel cell system 131, the water vapor may be used to humidify the PEM electrolyte and the methane simply acts as a diluting gas in a PEM system.

Alternatively, the carbon monoxide scrubbing device 133 may comprise a pressure swing adsorption ("PSA") unit. This unit is similar to the PPSA unit 1, except that a reciprocating compressor is used to pressurize the feed gas into one or more adsorbent beds which contain a material which selectively adsorbs carbon monoxide compared to hydrogen. The pressure swing adsorption unit may operate on a Skarstrom-like PSA cycle. The classic Skarstrom cycle consists of four basic steps: pressurization, feed, blowdown, and purge. For example, the PSA unit may contain two adsorbent beds. When one bed is undergoing pressurization and feed by the compressor, the other column is undergoing blowdown and purge. Three-way valves may be used to direct the feed, purge and product gases between the beds.

Alternatively, the optional device 131 may comprise a carbon monoxide tolerant electrochemical cell, such as a stack of high-temperature, low-hydration ion exchange membrane cells. This type of cell includes a non-fluorinated ion exchange ionomer membrane, such as, for example, a polybenzimidazole (PBI) membrane, located between anode and cathode electrodes. The membrane is doped with an acid, such as sulfuric or phosphoric acid. An example of such cell is disclosed in US published application US 2003/0196893 A1, incorporated herein by reference in its entirety. A stack 131 of these cells may be operated in a fuel cell mode to generate electricity for a vehicle or other uses when hydrogen is provided to the cells of the stack. These cells are carbon monoxide tolerant and operate in a temperature range of above 100 to about 200 degrees Celsius. Thus, the hydrogen containing stream is preferably provided to the stack 131 at a temperature above about 120 degrees Celsius. If a carbon monoxide tolerant device 131 is used, then the carbon monoxide scrubbing device 133 is preferably omitted.

The system 100 also contains a fuel splitter device 201, such as a computer or operator controlled multi-way valve, for example a three-way valve, or another fluid splitting device. The device 201 contains an inlet 203 operatively connected to the fuel cell stack fuel exhaust outlet 103, a first outlet 205 operatively connected to the condenser 113 and water separator 115 and a second outlet 207 operatively connected to the fuel cell stack fuel inlet 105. For example, the second outlet 207 may be operatively connected to the fuel inlet conduit 111, which is operatively connected to inlet 105. However, the second outlet 207 may provide a portion of the fuel exhaust stream into the fuel inlet stream further downstream.

Preferably, the system 200 contains a second blower or compressor 209 which provides the fuel exhaust stream into the fuel inlet stream. Specifically, the outlet 207 of the valve 201 is operatively connected to an inlet of the blower or compressor 209, while an outlet of the blower or compressor 209 is connected to the hydrocarbon fuel inlet conduit 111 which is the source of the hydrocarbon fuel inlet stream. In operation, the blower or compressor 209 controllably provides a desired amount of the fuel cell stack fuel exhaust stream into the fuel cell stack fuel inlet stream. In one aspect of this embodiment, the device 209 is a low temperature blower which operates at a temperature of 200 degrees Celsius or less. In this case, the heat exchangers 121 and 125 lower the temperature of the fuel exhaust stream to 200 degrees Celsius or less to allow the use of the low temperature blower 209.

The system 100 of the fifth embodiment operates as follows. A fuel inlet stream is provided into the fuel cell stack 101 through fuel inlet conduit 111. The fuel may comprise any suitable fuel, such as a hydrocarbon fuel, including but not limited to methane, natural gas which contains methane with hydrogen and other gases, propane or other biogas, or a mixture of a carbon fuel, such as carbon monoxide, oxygenated carbon containing gas, such as methanol, or other carbon containing gas with a hydrogen containing gas, such as water vapor, $H_2$ gas or their mixtures. For example, the mixture may comprise syngas derived from coal or natural gas reformation.

The fuel inlet stream is combined with a portion of the fuel exhaust stream such that hydrogen and humidity (i.e., water vapor) from the fuel exhaust stream is added to the fuel inlet stream. The humidified fuel inlet stream then passes through the fuel heat exchanger 121 where the humidified fuel inlet stream is heated by the fuel cell stack fuel exhaust stream. The heated and humidified fuel inlet stream is then provided into a reformer 123, which is preferably an external reformer. For example, reformer 123 may comprise a reformer described in U.S. patent application Ser. No. 11/002,681, filed on Dec. 2, 2004, incorporated herein by reference in its entirety. The fuel reformer 123 may be any suitable device which is capable of partially or wholly reforming a hydrocarbon fuel to form a carbon containing and free hydrogen containing fuel. For example, the fuel reformer 123 may be any suitable device which can reform a hydrocarbon gas into a gas mixture of free hydrogen and a carbon containing gas. For example, the fuel reformer 123 may comprise a catalyst coated passage where a humidified biogas, such as natural gas, is reformed via a steam-methane reformation reaction to form free hydrogen, carbon monoxide, carbon dioxide, water vapor and optionally a residual amount of unreformed biogas. The free hydrogen and carbon monoxide are then provided into the fuel (i.e., anode) inlet 105 of the fuel cell stack 101. Thus, with respect to the fuel inlet stream, which is located upstream of the reformer 123 which is located upstream of the stack 101.

The air or other oxygen containing gas (i.e., oxidizer) inlet stream is preferably provided into the stack 101 through a heat exchanger 127, where it is heated by the air (i.e., cathode) exhaust stream from the fuel cell stack. If desired, the air inlet stream may also pass through the condenser 113 and/or the air preheat heat exchanger 125 to further increase the temperature of the air before providing the air into the stack 101.

Once the fuel and air are provided into the fuel cell stack 101, the stack 101 is operated to generate electricity and a hydrogen containing fuel exhaust stream. The fuel exhaust stream (i.e., the stack anode exhaust stream) is provided from the stack fuel exhaust outlet 103 into the partial pressure swing adsorption unit 1. At least a portion of hydrogen contained in the fuel exhaust stream is separated in the unit 1 using a partial pressure swing adsorption. The hydrogen separated from the fuel exhaust stream in the unit 1 is then provided into the fuel inlet stream and/or to the hydrogen storage vessel 129 or the hydrogen using device 131.

The fuel exhaust stream is provided into the unit 1 as follows. The fuel exhaust stream may contain hydrogen, water vapor, carbon monoxide, carbon dioxide, some unreacted hydrocarbon gas, such as methane and other reaction by-products and impurities. For example, the fuel exhaust may have a flow rate of between 160 and 225 slpm, such as about 186 to about 196 slpm, and may comprise between about 45 to about 55%, such as about 48-50% hydrogen, about 40 to about 50%, such as about 45-47% carbon dioxide, about 2% to about 4%, such as about 3% water and about 1% to about 2% carbon monoxide.

This exhaust stream is first provided into the heat exchanger 121, where its temperature is lowered, preferably to less than 200 degrees Celsius, while the temperature of the fuel inlet stream is raised. If the air preheater heat exchanger 125 is present, then the fuel exhaust stream is provided through this heat exchanger 125 to further lower its temperature while raising the temperature of the air inlet stream. The temperature may be lowered to 90 to 110 degrees Celsius for example.

The fuel exhaust stream is then separated into at least two streams by the device 201. The first fuel exhaust stream is provided toward device 209 which recycles this first stream into the fuel inlet stream, while the second fuel exhaust stream is directed toward the PPSA unit 1 where at least a portion of hydrogen contained in the second fuel exhaust stream is separated using the partial pressure swing adsorption. At least a portion of the hydrogen separated from the second fuel exhaust stream is then provided to the hydrogen storage vessel 129 or the hydrogen using device 131, and/or a portion of the hydrogen and carbon monoxide separated from the second fuel exhaust stream are provided into the fuel inlet stream in the fuel inlet conduit 111. For example, between 50 and 70%, such as about 60% of the fuel exhaust stream may be provided to the second blower or compressor 209, while the remainder may be provided toward the PPSA unit 1.

Preferably, the fuel exhaust stream is first provided through the heat exchanger 121, reactor 128 and heat exchanger 125 before being provided into the valve 201. The fuel exhaust stream is cooled to 200 degrees Celsius or less, such as to 90 to 180 degrees, in the heat exchanger 125 prior to being provided into the valve 201 where it is separated into two streams. This allows the use of a low temperature blower 209 to controllably recycle a desired amount of the first fuel exhaust stream into the fuel inlet stream, since such blower may be adapted to move a gas stream which has a temperature of 200 degrees Celsius or less.

The first fuel exhaust stream is provided into the second blower or compressor 209 which recycles this stream into the fuel inlet stream. The device 209 may be computer or operator controlled and may vary the amount of the fuel exhaust stream being provided into the fuel inlet stream depending on any suitable parameters, which include: i) detected or observed conditions of the system 100 (i.e., changes in the system operating conditions requiring a change in the amount of hydrogen or CO in the fuel inlet stream); ii) previous calculations provided into the computer or conditions known to the operator which require a temporal adjustment of the hydrogen or CO in the fuel inlet stream; iii) desired future changes, presently occurring changes or recent past changes in the operating parameters of the stack 101, such as changes in the electricity demand by the users of electricity generated by the stack, changes in price for electricity or hydrocarbon fuel compared to the price of hydrogen, etc., and/or iv) changes in the demand for hydrogen by the hydrogen user, such as the hydrogen using device, changes in price of hydrogen or hydrocarbon fuel compared to the price of electricity.

Furthermore, the second blower or compressor may be operated in tandem with the first blower or compressor 109. Thus, the operator or computer may separately vary the amount of hydrogen being provided into vessel 129 or device 131, the amount of hydrogen and carbon monoxide being provided into the fuel inlet stream by the first blower or compressor 109, and the amount of fuel exhaust stream being provided into the fuel inlet stream by the second blower or compressor 209 based on any suitable criteria, such as the ones described above. Furthermore, the computer or operator may take into account both the amount of hydrogen and carbon monoxide being provided into the fuel inlet stream by the first blower or compressor 109 and the amount of fuel exhaust stream being provided into the fuel inlet stream by the second blower or compressor 209 and optimize the amount of both based on the criteria described above.

The second fuel exhaust stream is provided from the valve 201 into the condenser 113 where it is further cooled to condense additional water vapor from the fuel exhaust stream. The fuel exhaust stream may be cooled in the condenser by the fuel cell stack air inlet stream or by a different air inlet stream or by another cooling fluid stream. The water condensed from the fuel exhaust stream is collected in the liquid state in the water separator 115. Water may be discharged from the separator 115 via conduit 117 and then drained away or reused.

The remaining fuel exhaust stream gas is then provided from the separator 115 as the feed gas inlet stream into inlet 2 of the partial pressure swing adsorption unit 1 via conduit 3. Furthermore, the purge gas inlet stream, such as a dried air stream is provided into the unit 1 from blower or compressor 6 through conduit 5 into inlet 4. If desired, the air stream may be dried using additional adsorbent beds in a temperature swing adsorption cycle before being provided into adsorbent beds 11, 13 of the unit 1. In this case, the heated air used in the temperature swing adsorption cycle to dry the silica gel or alumina in the adsorbent beds may be removed from unit 1 via a vent conduit 139.

Thus, the second fuel exhaust stream comprises hydrogen, carbon monoxide, water vapor, carbon dioxide as well as possible impurities and =reacted hydrocarbon fuel. During the separation step in unit 1, at least a majority of the water vapor and carbon dioxide in the fuel exhaust stream are adsorbed in at least one adsorbent bed 11, 13 while allowing at least a majority of the hydrogen and carbon monoxide in the fuel exhaust stream to be passed through the at least one adsorbent bed. Specifically, unpressurized fuel exhaust stream is provided into the first adsorbent bed 11 to adsorb at least a majority of the water vapor and carbon dioxide remaining in the fuel exhaust stream in the first adsorbent bed until the first adsorbent bed is saturated, while the second adsorbent bed 13 is regenerated by providing air having a relative humidity of 50% or less at about 30 degrees Celsius through the second adsorbent bed to desorb adsorbed carbon dioxide and water vapor. After the first bed 11 is saturated with carbon dioxide, the unpressurized fuel exhaust stream is provided into the second adsorbent bed 13 to adsorb at least a majority of the remaining water vapor and carbon dioxide in the fuel exhaust stream in the second adsorbent bed until the second adsorbent bed is saturated while regenerating the first adsorbent bed by providing air having a relative humidity of 50% or less at about 30 degrees Celsius through the first adsorbent bed 11 to desorb the adsorbed carbon dioxide and water vapor.

The hydrogen and carbon monoxide separated from the fuel exhaust stream (i.e., feed gas outlet stream) are then removed from unit 1 through outlet 8 and conduit 7 and provided into the optional selector valve 108. The valve 108 divides the hydrogen containing stream provided from the PPSA unit 1 into a first stream, which is provided into the hydrocarbon fuel inlet stream in the inlet conduit 111, and a second stream which is provided to the hydrogen storage vessel 129 or the hydrogen using device 131.

The valve 108 may divide the hydrogen containing stream into contemporaneous first and second streams, such that the first and the second streams are provided from the valve 108 at the same time. The valve 108 may vary the ratio of how much of the hydrogen containing stream provided from the PPSA unit 1 is provided into a first stream and how much of the hydrogen containing stream is provided into the second stream over time. Alternatively, the valve 108 may alternate between providing at least 90-100% of the hydrogen containing stream into the hydrocarbon fuel inlet stream and providing 90 to 100% of the hydrogen containing stream to the hydrogen storage vessel 129, for example. If desired one of the streams may be omitted and the valve 108 may simply constantly direct the hydrogen containing stream into either the vessel 129/device 131 or into the fuel inlet conduit 111.

The valve 108 may be operated by a computer and/or by an operator to controllably provide a desired amount of hydrogen into the fuel inlet stream and/or to one of the hydrogen storage vessel and the hydrogen using device. The computer or operator may vary this amount based on any suitable parameter. The parameters include: i) detected or observed conditions of the system 100 (i.e., changes in the system operating conditions requiring a change in the amount of hydrogen or CO in the fuel inlet stream); ii) previous calculations provided into the computer or conditions known to the operator which require a temporal adjustment of the hydrogen or CO in the fuel inlet stream; iii) desired future changes, presently occurring changes or recent past changes in the operating parameters of the stack 101, such as changes in the electricity demand by the users of electricity generated by the stack, changes in price for electricity or hydrocarbon fuel compared to the price of hydrogen, etc., and/or iv) changes in the demand for hydrogen by the hydrogen user, such as the hydrogen using device, changes in price of hydrogen or hydrocarbon fuel compared to the price of electricity, etc.

The second hydrogen rich stream may be provided directly to vessel 129 or device 131 or it may first be provided through the carbon monoxide scrubbing device 133 to scrub carbon monoxide from the second stream before providing the stream to a carbon monoxide intolerant device. For example, the second hydrogen stream may be first provided to the hydrogen storage vessel 129 and then provided from the hydrogen storage vessel 129 to the hydrogen using device, such as a PEM fuel cell system 131 in a vehicle, on demand or according to a predefined schedule. Alternatively, the second hydrogen stream may be provided to the hydrogen using device, such as a PEM fuel cell system 131 without first being provided to the hydrogen storage vessel 129.

The first hydrogen rich stream provided from the selector valve is recycled into the fuel inlet stream in the fuel inlet conduit 111. Preferably, this first hydrogen rich stream containing hydrogen and carbon monoxide is first provided into a blower or compressor 109, which is then used to controllably provide a desired amount of hydrogen and carbon monoxide separated from the fuel exhaust stream into the fuel inlet stream. The blower or compressor 109 may be operated by a computer or by an operator to controllably provide a desired amount of hydrogen and carbon monoxide into the fuel inlet stream, and may vary this amount based on any suitable parameter. The parameters include: i) detected or observed conditions of the system 100 (i.e., changes in the system operating conditions requiring a change in the amount of hydrogen or CO in the fuel inlet stream); ii) previous calculations provided into the computer or conditions known to the operator which require a temporal adjustment of the hydrogen or CO in the fuel inlet stream; and/or iii) desired future changes, presently occurring changes or recent past changes in the operating parameters of the stack 101, such as changes in the electricity demand by the users of electricity generated by the stack, etc. Thus, the blower or compressor may controllably vary the amount of hydrogen and carbon monoxide provided into the fuel inlet stream based on the above described and/or other criteria. Since the hydrogen and carbon monoxide are cooled to 200 degrees Celsius or less, a low temperature blower may be used to controllably provide the hydrogen and carbon monoxide into the conduit 111. If desired, the selector valve 108 and the blower or compressor 109 may be omitted and the entire hydrogen rich stream may be provided from the PPSA unit 1 to the hydrogen storage vessel 129 or the hydrogen using device 131.

The purge gas outlet stream from the PPSA unit may contain a trace amount of hydrogen and/or hydrocarbon gases trapped in the void volumes of the adsorbent beds. In other words, some trapped hydrogen or hydrocarbon gas may not be removed into conduit 7 by the flush steps. Thus, it is preferred that conduit 9 provide the purge gas outlet stream from PPSA unit 1 to a burner 107. The stack 101 air exhaust stream is also provided through heat exchanger 127 into the burner 107. Any remaining hydrogen or hydrocarbon gas in the purge gas outlet stream is then burned in the burner to avoid polluting the environment. The heat from the burner 107 may be used to heat the reformer 123 or it may be provided to other parts of the system 100 or to a heat consuming devices outside the system 100, such as a building heating system.

Thus, with respect to the fuel exhaust stream, the heat exchanger 121 is located upstream of the heat exchanger 125, which is located upstream of the condenser 113 and water separator 115, which is located upstream of the PPSA unit 1, which is located upstream of blower or compressor 109 which is located upstream of the fuel inlet conduit 111.

If desired, the system 100 may be used together with a humidifier. Such a system could then be operated in different modes to optimize electricity generation or to optimize hydrogen production for the hydrogen storage vessel 129 or the hydrogen using device 131. The system may be switched between different modes depending on the demand for and/or price of electricity and hydrogen or other factors.

The humidifier may having a first inlet operatively connected to a hydrocarbon fuel source, such as the hydrocarbon fuel inlet conduit 111, a second inlet operatively connected to the valve 201, a first outlet operatively connected to the fuel cell stack fuel inlet 105, and a second outlet operatively connected to the condenser 113 and water separator 115. In operation, the fuel humidifier humidifies a hydrocarbon fuel inlet stream from conduit 111 containing the recycled hydrogen and carbon monoxide using water vapor contained in a fuel cell stack fuel exhaust stream. The fuel humidifier may comprise a polymeric membrane humidifier, such as a Nafion® membrane humidifier, an enthalpy wheel or a plurality of water adsorbent beds, as described for example in U.S. Pat. No. 6,106,964 and in U.S. application Ser. No. 10/368,425, both incorporated herein by reference in their entirety. For example, one suitable type of humidifier comprises a water vapor and enthalpy transfer Nafion® based, water permeable membrane available from Penna Pure LLC. The humidifier passively transfers water vapor and enthalpy from the fuel exhaust stream into the fuel inlet stream to provide a 2 to 2.5 steam to carbon ratio in the fuel inlet stream. The fuel inlet stream temperature may be raised to about 80 to about 90 degrees Celsius in the humidifier.

When the system is operated to optimize electricity generation (i.e., to optimize the AC electrical efficiency of the system), the selector valve 108 provides the entire hydrogen rich stream from the PPSA unit 1 back into the fuel inlet conduit. The valve 201 provides a portion of the fuel exhaust stream into the fuel inlet conduit 111 to humidify the fuel inlet stream. In this case, the valve 201 may route the fuel exhaust stream into the fuel inlet conduit to by-pass the humidifier. The per pass fuel utilization rate is maximized to the highest reasonable operating value, such as about 75% to about 80%, for example, to optimize the electricity production. In this case, no hydrogen is provided to the hydrogen storage vessel 129 or to the hydrogen using device 131.

When the system is operated to optimize hydrogen generation for the hydrogen storage vessel 129 or to the hydrogen using device 131, the selector valve 108 provides the entire hydrogen rich stream from the PPSA unit 1 to the hydrogen storage vessel 129 or to the hydrogen using device 131. No hydrogen rich stream is provided into the fuel inlet conduit. In this case, the valve 201 provides the entire fuel exhaust stream from the stack into the humidifier where the fuel inlet stream is humidified, rather than providing a portion of the fuel exhaust stream into the fuel inlet conduit 111. The per pass fuel utilization rate is minimized to the lowest reasonable operating value, such as about 55% to about 60%, for example, to optimize the hydrogen production. In this case, a maximum amount of hydrogen is provided to the hydrogen storage vessel 129 or to the hydrogen using device 131. Furthermore, more hydrocarbon fuel may be provided to the fuel cell stack when the system operates to optimize hydrogen production than when the system operates to optimize electrical efficiency. For example, 50-100% more hydrocarbon fuel is provided to the stack 101 when the system is operating to optimize hydrogen production than when the system is operating to optimize electrical efficiency.

The system may also be operated to balance electrical efficiency and hydrogen production. In this case, the selector valve 108 splits the hydrogen rich stream from the PPSA unit 1 between the fuel inlet conduit 111 and the hydrogen storage vessel 129/hydrogen using device 131. Both streams may be provided at the same time or the valve may alternate between providing the first and the second streams. The amount of hydrogen provided between the two streams can be varied depending on the conditions described above. In this case, the valve 201 may provide the fuel exhaust stream into the fuel inlet stream and/or into the humidifier 119, depending on the desired parameters.

Table I below illustrates several exemplary operating modes for the system to generate the same power output of 26.8 kW. The first mode is the electrical efficiency optimization mode described above, where the selector valve 108 provides the entire hydrogen rich stream into the fuel inlet conduit 111 ("hydrogen recycle ON") and valve 201 provides a portion of the fuel exhaust stream into the fuel inlet conduit 111 ("fuel exhaust recycle ON"). The electrical efficiency is optimized to about 58% for a relatively low natural gas fuel flow rate. The second mode is similar to the first mode, except that valve 201 provides the fuel exhaust stream to the humidifier 119 which humidifies the fuel inlet stream (the hydrogen recycle is ON while the fuel exhaust recycle is OFF).

The third mode is the opposite of the second mode, where the selector valve 108 provides the hydrogen rich stream into the vessel 129/device 131 ("hydrogen recycle OFF") and the valve 201 provides a portion of the fuel exhaust stream into the fuel inlet conduit 111 ("fuel exhaust recycle ON").

The fourth and fifth modes are the hydrogen generation optimization modes, where the selector valve 108 provides the hydrogen rich stream to vessel 129 or device 131 ("hydrogen recycle OFF") and the humidifier 119 is used to humidify the fuel inlet stream ("fuel exhaust recycle OFF"). In the fifth mode, the per pass fuel utilization rate is decreased 20% and the natural gas flow rate is increased compared to the fourth mode to more than triple the hydrogen generation. Thus, in the fifth mode, the hydrogen generation is optimized at the expense of the low electrical efficiency (below 40%), low per pass fuel utilization rate (55%) and a relatively high natural gas fuel flow rate.

TABLE I

| Mode | Recycle Streams ON/OFF | Fuel utilization, % | Natural gas MMBtu/hr | Electrical efficiency, % | Hydrogen generated, kg/day |
|---|---|---|---|---|---|
| 1 | Fuel Exhaust Recycle ON + Hydrogen Recycle ON | 75 | 0.16 | 57.9 | 0 |
| 2 | Fuel Exhaust Recycle OFF + Hydrogen Recycle ON | 75 | 0.18 | 51.5 | 0 |
| 3 | Fuel Exhaust Recycle ON + Hydrogen Recycle OFF | 75 | 0.17 | 55.4 | 1.4 |
| 4 | Fuel Exhaust Recycle OFF + Hydrogen Recycle OFF | 75 | 0.20 | 46.3 | 5.4 |
| 5 | Fuel Exhaust Recycle OFF + Hydrogen Recycle OFF | 55 | 0.27 | 33.8 | 19.1 |

Figure 6:
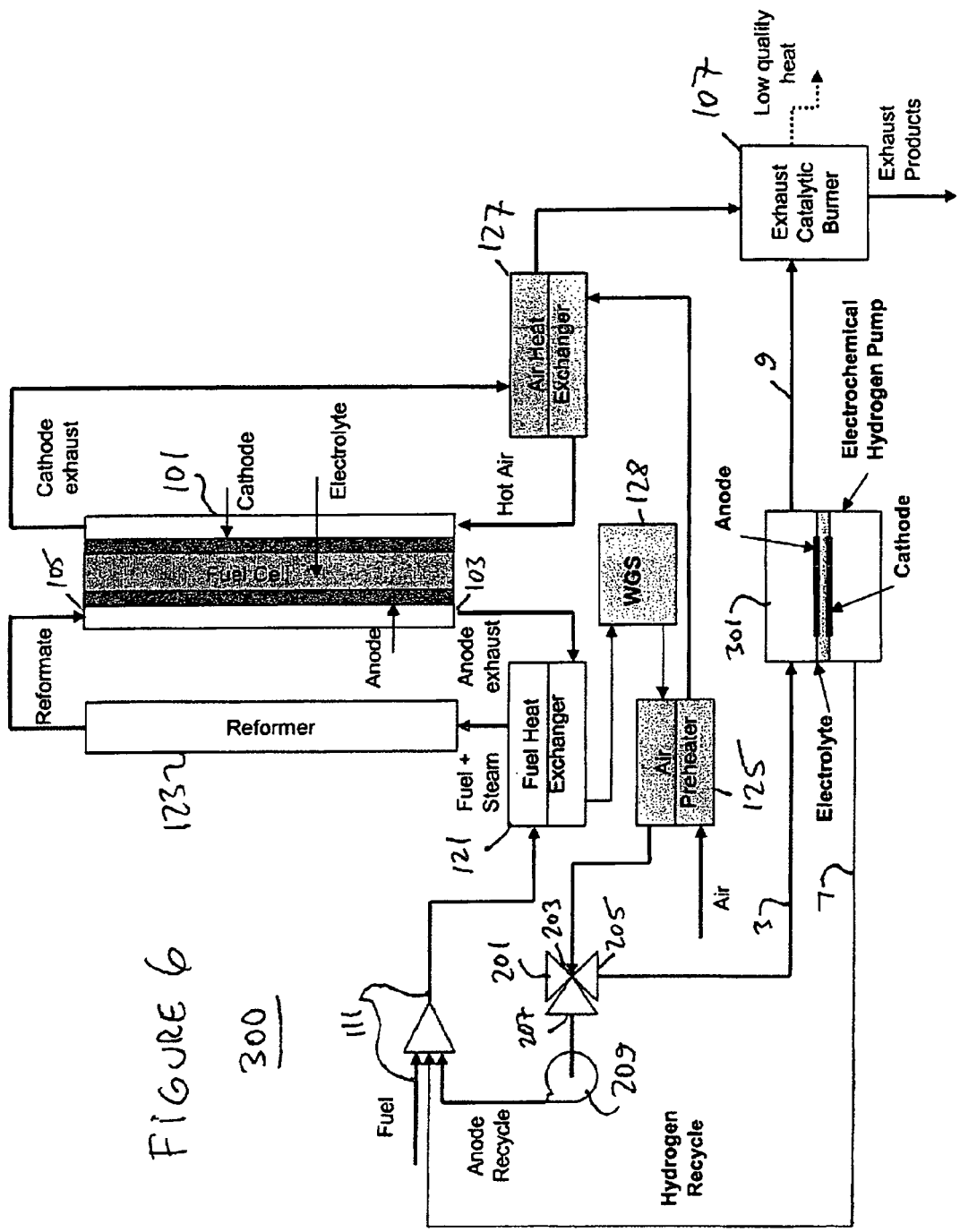

FIG. 6 illustrates a system 300 according to the sixth embodiment of the invention. The system 300 is similar to system 100, except that the PPSA unit 1, the condenser 113 and water separator 115 are replaced with an electrochemical hydrogen pump 301. The pump 301 electrochemically separates hydrogen from the fuel exhaust stream.

The electrochemical pump 301 may comprise any suitable proton exchange membrane device comprising a polymer electrolyte. The hydrogen diffuses through the polymer electrolyte under an application of a potential difference between anode and cathode electrodes located on either side of the electrolyte. Preferably, the electrochemical pump comprises a stack of carbon monoxide tolerant electrochemical cells, such as a stack of high-temperature, low-hydration ion exchange membrane cells. This type of cell includes a non-fluorinated ion exchange ionomer membrane, such as, for example, a polybenzimidazole (PBI) membrane, located between anode and cathode electrodes. The membrane is doped with an acid, such as sulfuric or phosphoric acid. An example of such cell is disclosed in US published application US 2003/0196893 A1, incorporated herein by reference in its entirety. These cells operate in a temperature range of above 100 to about 200 degrees Celsius. Thus, the heat exchangers 121 and 125 preferably keep the fuel exhaust stream at a temperature of about 120 to about 200 degrees Celsius such as about 160 to about 190 degrees Celsius. FIG. 6 does not illustrate for clarity the valve 108 and hydrogen storage vessel 129 or the hydrogen using device 131. However, these devices may be used in the system 300 if desired. Since the pump 301 provides a hydrogen stream that lacks a substantial amount of carbon monoxide, the CO scrubber 135 is not required to be used with the pump 301 and the hydrogen is provided into the fuel inlet stream without the carbon monoxide.

The method of operating the system 300 is similar to the method of operating the system 100, except that the fuel exhaust stream is provided directly from valve 201 into the electrochemical pump 301, which electrochemically separates the hydrogen from the fuel exhaust stream. Furthermore, the blower or compressor 109 may be omitted if the pump 301 is capable of controllably providing a desired amount of hydrogen into the fuel inlet stream. In the method of the sixth embodiment, the effective fuel utilization rate is about 94% and the electrical efficiency is about 58% when the per pass fuel utilization rate is 75%, 60% of the fuel exhaust stream is recycled into the fuel inlet stream by valve 201 and about 85% of the hydrogen is recovered from the remaining fuel exhaust stream by pump 301 and recycled into the fuel inlet stream.

In a seventh embodiment of the invention, a temperature swing adsorption ("TSA") unit is used to separate hydrogen from the fuel exhaust stream instead of the PPSA unit 1. A TSA unit also does not require the feed gas to be pressurized.

The TSA unit also contains a plurality of adsorbent beds of material which preferentially adsorbs carbon dioxide and water vapor to hydrogen and carbon monoxide. The fuel exhaust stream is provided to at least one first adsorbent bed which is maintained at room temperature or other low temperature to adsorb at large portion of carbon dioxide and water vapor from the fuel exhaust stream. When the first beds is saturated with carbon dioxide and water vapor, the fuel exhaust stream is switched to at least one second adsorbent bed. The first bed is then purged to release the adsorbed carbon dioxide and water vapor by increasing the temperature of the first bed. For example, the first bed may be heated by heat provided by the fuel cell stack, such as by providing the hot stack cathode air exhaust in heat exchange with the first bed. After purging, the first bed is then cooled with ambient air heat exchange. The cycle continues through the multiple beds to provide a constant recovery and circulation of the fuel. This embodiment is also amenable to the sequestration of carbon dioxide.

Rather than providing air in heat exchange with (i.e., adjacent to) the beds, the hot cathode exhaust may be directed through the adsorbent beds directly (with no separate heat exchanger) to discharge the carbon dioxide and water vapor. Then cool ambient air is passed directly through the beds to condition the beds for the next cycle. If desired, a small quantity of nitrogen may be is purged through the beds before and after the bed is reconditioned for additional carbon dioxide and water adsorption. The nitrogen is obtained from a small temperature swing adsorption device using air as the working fluid.

If desired, the TSA effluent, such as the carbon dioxide and water vapor containing effluent, may be discharged to ambient or removed via a vacuum pump after the purge gas is stopped. The vacuum removes more of the residual carbon dioxide and water (a process akin to pressure-swing adsorption, and commonly referred to as vacuum-swing adsorption) which might offer a less expensive and faster means to cool the bed than might be achieved using cool air or heat exchange. The use of the vacuum may also be amenable to the sequestration of carbon dioxide.

FIG. 7 illustrates a system 400 according to the eighth embodiment of the invention. The system 400 is similar to system 100, except that the PPSA unit 1, blower or compressor 109 and water separator 115 are omitted. The condenser 113 may also be optionally omitted. The method of operating the system 400 is similar to the method of operating the system 100, except that the second separated fuel exhaust stream provided from valve 201 is not subjected to hydrogen separation. Instead, the second separated fuel exhaust stream provided from the valve 201 is either vented or provided to the burner 107. This system 400 is thus simpler than the systems of the prior embodiments, since it does not include hydrogen separation steps and equipment. The method of operating the system 400 allows the use of a low temperature blower 209 by cooling the fuel exhaust stream to less than 200 degrees Celsius, such as about 90 to 110 degrees Celsius, by passing this stream through heat exchangers 121 and 125 in series. In the method of the eighth embodiment, the electrical efficiency is about 54% when the per pass fuel utilization rate is 75% and 60% of the fuel exhaust stream is recycled into the fuel inlet stream by valve 201.

The method of the eighth embodiment is similar to the method of the fifth embodiment up to the point where the fuel exhaust stream is provided into the device 201. As noted above, the fuel splitter device 201 is preferably a computer or operator controlled multi-way valve, such as a three-way valve. The valve 201 separates the fuel exhaust stream into a first separated fuel exhaust stream and a second separated fuel exhaust stream. The first separated fuel exhaust stream is provided into the blower 209 from valve 201 outlet 207. The blower 209 recycles the first separated fuel exhaust stream into the fuel inlet stream at the mixer in the fuel inlet conduit 111. Preferably, as noted above, the blower 209 is a low temperature blower which recycles the first separated fuel exhaust stream having a temperature of 200 C or less into the fuel inlet stream.

In one aspect of the present embodiment, the amount of fuel exhaust provided into the fuel inlet stream is controlled by an operator or automatically by a computer to achieve a steam to carbon ratio of between 2:1 and 2.3:1 in the fuel inlet stream. The first separated fuel exhaust stream contains steam and the fuel inlet stream comprises a hydrocarbon fuel inlet stream, such as a methane or natural gas stream. Thus, the amount of fuel exhaust (and thus the amount of steam) provided into the fuel inlet stream is controlled to achieve a steam to carbon ratio of between 2:1 and 2.3:1, such as a 2.2:1 ratio, in the fuel inlet stream. For methane fuel, each methane molecule provided into the reformer contains one carbon atom. Thus, the $H_2O$:C molar ratio is based on the ratio of $H_2O$ molecules to methane molecules. However, for other hydrocarbon fuels which contain hydrocarbon molecules with more than one carbon atom per molecule, the ratio of $H_2O$ molecules to such hydrocarbon molecules would be greater than 2.3:1 to maintain the desired steam to carbon ratio. The amount of fuel exhaust being recycled into the fuel inlet stream can be varied continuously or intermittently to continuously maintain the steam to carbon ratio between 2:1 and 2.3:1 in the fuel inlet stream during operation of the fuel cell stack. This steam to carbon ratio is advantageous for optimum steam-methane reformation in the reformer 123.

As used herein, the term "controllably" means that the amount of fuel exhaust provided into a fuel inlet stream is actively controlled as opposed to passively provided into the fuel inlet stream without control. Thus, simply routing a part of the exhaust stream into the fuel inlet stream through a "T"-shaped branched pipe is not controllably providing the exhaust stream into the inlet stream. The amount of fuel exhaust being recycled can be controlled by the operator or by a computer by controlling one or both of the valve 201 and/or the blower 209. For example, the valve 201 may be controlled to vary the ratio of the first separated fuel exhaust stream to the second separated fuel exhaust stream. In other words, if more steam is needed in the fuel inlet stream, then the valve increases the portion of the fuel exhaust stream which is provided into the first separated fuel exhaust stream. If less steam is needed in the fuel inlet stream, then the valve decreases the portion of the fuel exhaust stream which is provided into the first separated fuel exhaust stream. The blower 209 may be controlled by increasing or decreasing the blowing speed or rate to increase or decrease the amount of fuel exhaust being provided by the blower 209 into the fuel inlet stream depending on whether more or less steam is required in the fuel inlet stream.

Preferably, at least one operating parameter of the fuel cell system is detected (i.e., monitored) to determine the amount of fuel exhaust that needs to be recycled into the fuel inlet stream. For example, the temperature of the stack or balance of plant components may be monitored with a temperature sensor, the fuel inlet and exhaust flows may be monitored with a gas flow meter, the amount of power, current or voltage generated by the stack may be monitored by an appropriate electronic detector (i.e., watt meter, volt meter, amp meter, etc.), etc. Based on the detected operating parameter(s), the computer or operator then varies at least one of a ratio of the first separated fuel exhaust stream to the second separated fuel exhaust stream or an amount in the first separated fuel exhaust stream being recycled into the fuel inlet stream by the blower. For example, a computer may be used to automatically control the multi-way valve 201 and/or the blower 209 based on the detected parameters being provided into the computer from one of the system detectors (i.e., sensors). Alternatively, the operator may control the valve 201 and/or blower 209 by using the system control panel based on displayed parameter(s).

The second separated fuel exhaust stream is provided from the output 205 of the valve 201 into the burner 107. The second stream may be provided directly or indirectly from the valve 201 into the burner 107. For example, the output 205 of the valve 201 may be directly connected to the burner 107 by a conduit. If desired, additional air and/or fuel may be provided to the burner 107 from outside the system. Alternatively, in an indirect connection, an optional condenser 113 (shown in FIG. 5) may be provided between the output 205 of valve 201 and the burner 107. In that case, water is removed from the second separated fuel exhaust stream before the this stream enters the burner 107. The water from the optional condenser may be provided into an optional steam generator which is heated by an exhaust stream of the fuel cell stack, as described in U.S. application Ser. No. 11/124,120 filed on May 9, 2005. The steam generator may be positioned inside the hot box or in contact with a surface of the hot box. The steam generator provides water vapor (steam) into the fuel inlet stream. A single mixer may be used to mix the fuel inlet stream, the first separated fuel exhaust stream and the steam from the steam generator. The heat from the burner 107 may be provided to the reformer 123 to increase the temperature of the reformer 123. If desired, the stack air exhaust stream may be provided adjacent to the reformer 123 to also increase the temperature of the reformer, as disclosed in U.S. application Ser. No. 11/002,681, filed Dec. 2, 2004, prior to being provided into the heat exchanger 127.

The fuel cell systems described herein may have other embodiments and configurations, as desired. Other components may be added if desired, as described, for example, in U.S. application Ser. No. 10/300,021, filed on Nov. 20, 2002, in U.S. Provisional Application Ser. No. 60/461,190, filed on Apr. 9, 2003, and in U.S. application Ser. No. 10/446,704, filed on May 29, 2003 all incorporated herein by reference in their entirety. Furthermore, it should be understood that any system element or method step described in any embodiment and/or illustrated in any figure herein may also be used in systems and/or methods of other suitable embodiments described above, even if such use is not expressly described.

The foregoing description of the invention has been presented for purposes of illustration and description. It is not intended to be exhaustive or to limit the invention to the precise form disclosed, and modifications and variations are possible in light of the above teachings or may be acquired from practice of the invention. The description was chosen in order to explain the principles of the invention and its practical application. It is intended that the scope of the invention be defined by the claims appended hereto, and their equivalents.

What is claimed is:

1. A method of operating a fuel cell system, comprising:
providing a fuel inlet stream into a fuel cell stack;
operating the fuel cell stack to generate electricity, an air exhaust stream and a fuel exhaust stream, the fuel exhaust stream having a temperature above 200 C and a first composition immediately after leaving the fuel cell stack;
heating the fuel inlet stream with the entire fuel exhaust stream in a fuel heat exchanger;
heating a fuel cell stack air inlet stream with an output of the fuel heat exchanger in an air preheater heat exchanger;
splitting the fuel exhaust stream into a first split fuel exhaust stream and a second split fuel exhaust stream such that the first and second split fuel exhaust streams have the same first composition;
lowering a temperature of at least the entire of the first or second split fuel exhaust streams to 200 C or less;
recycling the first split fuel exhaust stream into the fuel inlet stream; and
burning the second fuel exhaust stream with the air exhaust stream, wherein heating the fuel inlet stream is performed prior to burning the second fuel exhaust stream;
wherein neither the fuel exhaust stream, the first split fuel exhaust stream nor the second split fuel exhaust stream is passed through a water gas shift reactor.

2. The method of claim 1, further comprising using a low temperature blower to controllably recycle the first split fuel exhaust stream having a temperature of 200 C or less into the fuel inlet stream.

3. The method of claim 2, wherein:
the first split fuel exhaust stream contains steam;
the fuel inlet stream comprises a hydrocarbon fuel inlet stream; and
the step of recycling comprises controllably recycling the first split fuel exhaust stream into the fuel inlet stream to achieve a steam to carbon ratio of between 2:1 and 2.3:1 in the fuel inlet stream.

4. The method of claim 3, further comprising varying an amount of fuel exhaust being recycled into the fuel inlet stream to continuously maintain the steam to carbon ratio of between 2:1 and 2.3:1 in the fuel inlet stream during operation of the fuel cell stack.

5. The method of claim 4, wherein the fuel cell stack comprises a solid oxide fuel cell stack and the fuel inlet stream comprises a methane or a natural gas fuel inlet stream.

6. The method of claim 5, further comprising:
providing the fuel inlet stream into a reformer;
reforming the fuel inlet stream in the reformer;
providing the reformed fuel inlet stream into the fuel cell stack; and
using at least one of radiative, convective or conductive heat generated in the fuel cell stack or an air exhaust stream from the fuel cell stack to heat the reformer.

7. The method of claim 1, wherein the first split fuel exhaust stream is lowered to a temperature of 200 C or less.

8. The method of claim 1, further comprising providing the second split fuel exhaust stream into a catalytic burner.

9. The method of claim 1, wherein the entire fuel exhaust stream is provided from the fuel cell stack directly into the fuel heat exchanger.

10. The method of claim 9, wherein only the fuel inlet stream and the entire fuel exhaust stream are provided into the fuel heat exchanger.

11. The method of claim 10, wherein the fuel heat exchanger is located upstream of the air preheater heat exchanger.

12. The method of claim 1, further comprising providing an air inlet stream into the fuel cell stack and heating the air inlet stream using the air exhaust stream in an air heat exchanger.

* * * * *